(12) United States Patent  
Ryan

(10) Patent No.: US 12,541,939 B2
(45) Date of Patent: Feb. 3, 2026

(54) IMAGE PROCESSING SYSTEM AND METHOD

(71) Applicant: SITA Information Networking Computing UK Limited, Hayes Middlesex (GB)

(72) Inventor: Sid Ryan, Montreal (CA)

(73) Assignee: SITA Information Networking Computing UK Limited, Middlesex (GB)

( * ) Notice: Subject to any disclaimer, the term of this patent is extended or adjusted under 35 U.S.C. 154(b) by 563 days.

(21) Appl. No.: 17/781,887

(22) PCT Filed: Dec. 17, 2020

(86) PCT No.: PCT/GB2020/053264
§ 371 (c)(1),
(2) Date: Jun. 2, 2022

(87) PCT Pub. No.: WO2021/123790
PCT Pub. Date: Jun. 24, 2021

(65) Prior Publication Data
US 2023/0040513 A1 Feb. 9, 2023

(30) Foreign Application Priority Data

Dec. 19, 2019 (GB) .................................. 1918893
May 5, 2020 (EP) .................................. 20172992

(51) Int. Cl.
*G06V 10/25* (2022.01)
*G06T 7/11* (2017.01)
(Continued)

(52) U.S. Cl.
CPC ................ *G06V 10/25* (2022.01); *G06T 7/11* (2017.01); *G06T 7/70* (2017.01); *G06V 10/50* (2022.01);
(Continued)

(58) Field of Classification Search
CPC ...... G06V 10/50; G06V 10/25; G06V 10/761; G06V 10/764; G06V 20/52; G06V 20/53;
(Continued)

(56) References Cited

U.S. PATENT DOCUMENTS 7,104,453 B1 9/2006 Zhu et al.
2009/0304230 A1 12/2009 Krahnstoever et al.
(Continued)

FOREIGN PATENT DOCUMENTS

| EP | 3270342 A1 | 1/2018 |
| EP | 3786836 A1 | 3/2021 |
| WO | 2021038218 A1 | 3/2021 |

OTHER PUBLICATIONS

Czyżewski, Andrzej, et al. "Multi-stage video analysis framework." Video surveillance (2011): 147-172. (Year: 2011).*
(Continued)

*Primary Examiner* — Tracy Mangialaschi
(74) *Attorney, Agent, or Firm* — Bradley Arant Boult Cummings LLP; Daniel E. Sineway, Esq.; Adam J. Thompson. , Esq.

(57) ABSTRACT

There is provided an image processing system and method for identifying a user. The system comprises a processor configured to identify a first user in an image, determine a plurality of characteristic vectors associated with the first user, compare the characteristic vectors associated with the first user with a plurality of predetermined characteristic vectors associated with a plurality of users including the first user, and identify the first user based on the comparison.

17 Claims, 19 Drawing Sheets

(51) Int. Cl.
| | |
|---|---|
| *G06T 7/70* | (2017.01) |
| *G06V 10/50* | (2022.01) |
| *G06V 10/74* | (2022.01) |
| *G06V 10/764* | (2022.01) |
| *G06V 20/40* | (2022.01) |
| *G06V 20/52* | (2022.01) |
| *G06V 40/10* | (2022.01) |
| *G06V 40/16* | (2022.01) |

(52) U.S. Cl.
CPC .......... *G06V 10/761* (2022.01); *G06V 10/764* (2022.01); *G06V 20/52* (2022.01); *G06V 20/53* (2022.01); *G06V 40/103* (2022.01); *G06V 40/171* (2022.01); *G06T 2207/20081* (2013.01); *G06V 20/44* (2022.01); *G06V 2201/07* (2022.01)

(58) Field of Classification Search
CPC .... G06V 20/44; G06V 40/171; G06V 40/103; G06V 2201/07; G06T 7/11; G06T 7/70; G06T 2207/20081
See application file for complete search history.

(56) References Cited

U.S. PATENT DOCUMENTS

| | | | |
|---|---|---|---|
| 2012/0033083 | A1 | 2/2012 | Hörbinger et al. |
| 2013/0155229 | A1* | 6/2013 | Thornton ................ H04N 7/18 348/143 |
| 2016/0117631 | A1 | 4/2016 | McCloskey et al. |
| 2017/0004384 | A1 | 1/2017 | Audo et al. |
| 2018/0018627 | A1* | 1/2018 | Ross ..................... G06F 16/583 |
| 2022/0139067 | A1 | 5/2022 | Liu |

OTHER PUBLICATIONS

Viola, Paul, and Michael Jones. "Rapid object detection using a boosted cascade of simple features." Proceedings of the 2001 IEEE computer society conference on computer vision and pattern recognition. CVPR 2001. vol. 1. IEEE, 2001. (Year: 2001).*

Camps, Octavia, et al. "From the lab to the real world: Re-identification in an airport camera network." IEEE transactions on circuits and systems for video technology 27.3 (2017): 540-553. (Year: 2017).*

Anonymous: "Convolutional Neural Network—Wikipedia," Wikipedia, Jul. 29, 2019, 28 Pages, XP055735969.

Communication Pursuant to Article 94(3) EPC issued in European Application No. 20166042.0, dated Nov. 8, 2022, 6 Pages.

Extended European Search Report for European Application No. 20166042.0, mailed Jan. 12, 2021, 10 Pages.

Extended European Search Report for European Application No. 20172992.8, mailed Feb. 10, 2021, 12 Pages.

International Preliminary Report on Patentability for International Application No. PCT/GB2020/052037, mailed Mar. 10, 2022, 09 Pages.

International Preliminary Report on Patentability for International Application No. PCT/GB2020/053264, mailed Jun. 30, 2022, 11 Pages.

International Search Report and Written Opinion for International Application No. PCT/GB2020/052037, mailed Oct. 30, 2020, 11 Pages.

Johnson M et al., "Real-Time Baggage Tracking using a Modified Background Subtraction Algorithm," IEEE, 19th International Conference on Mechatronics and Machine Vision in Practice (M2VIP), Nov. 28-30, 2012, pp. 200-204, ISBN: 978-1-4673-1643-9, XP030346594.

Partial European Search Report for European Application No. 20172992.8, mailed Nov. 4, 2020, 15 Pages.

Non-Final Office Action for U.S. Appl. No. 17/638,234 dated Jun. 26, 2024, 12 pages.

International Search Report issued in International Application No. PCT/GB2020/053264, dated Mar. 13, 2021 (4 pages).

Viola P., et al., "Rapid object detection using a boosted cascade of simple features", Proceedings 2001 IEEE Conference on Computer Vision and Pattern Recognition. CVPR 2001. Kaual, Hawaitt, Dec. 8-14, 2001; [Proceedings of the IEEE Computer Conference on Computer Vision and Pattern Recognition], IEEE Computer Society, Los Alamitos, C, vol. 1, Dec. 8, 2001, pp. 511-518, XP010583787, ISBN: 978-0-7695-1272-3 section 2-4.

Andrzej Czewski, et al., "Multi-Stage Video Analysis Framework" In: "Video Surveillance", Feb. 3, 2011, InTech, XP055729003, ISBN: 978-953-30-7436-8 DOI: 10.5772/16088, section 3, 5 and 7; figures 4, 14 p. 160, paragraph 2.

* cited by examiner

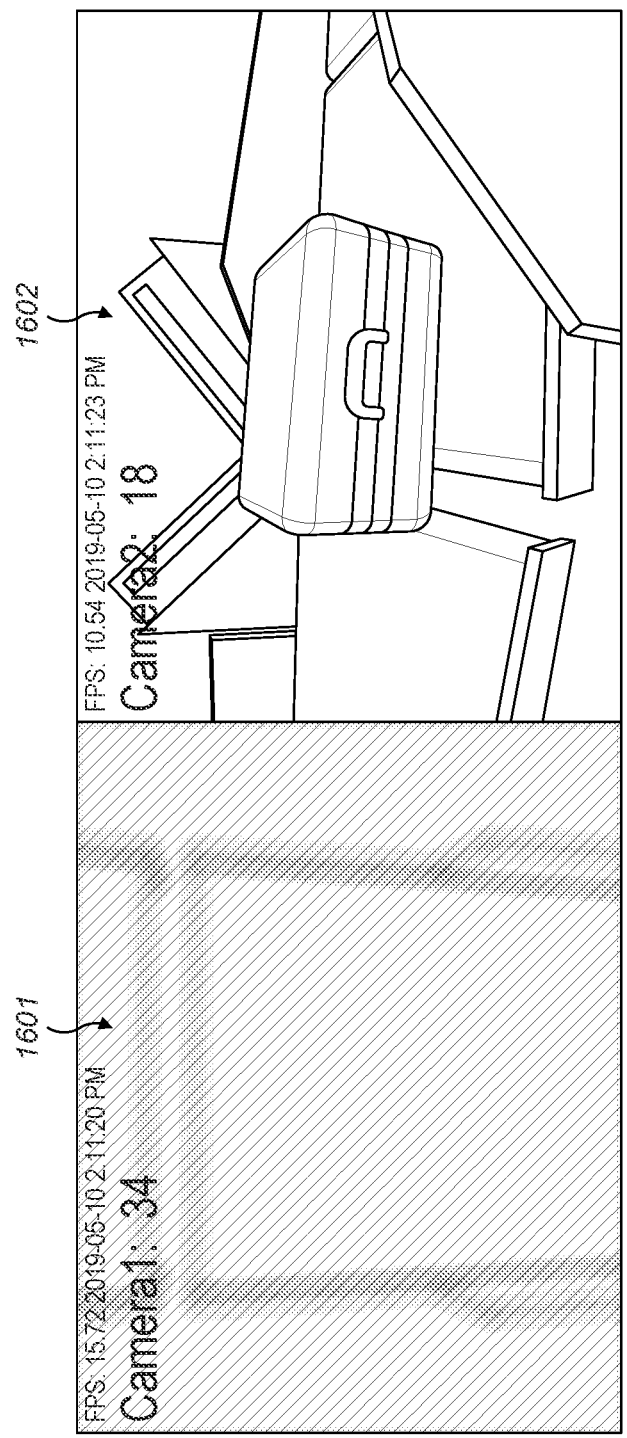

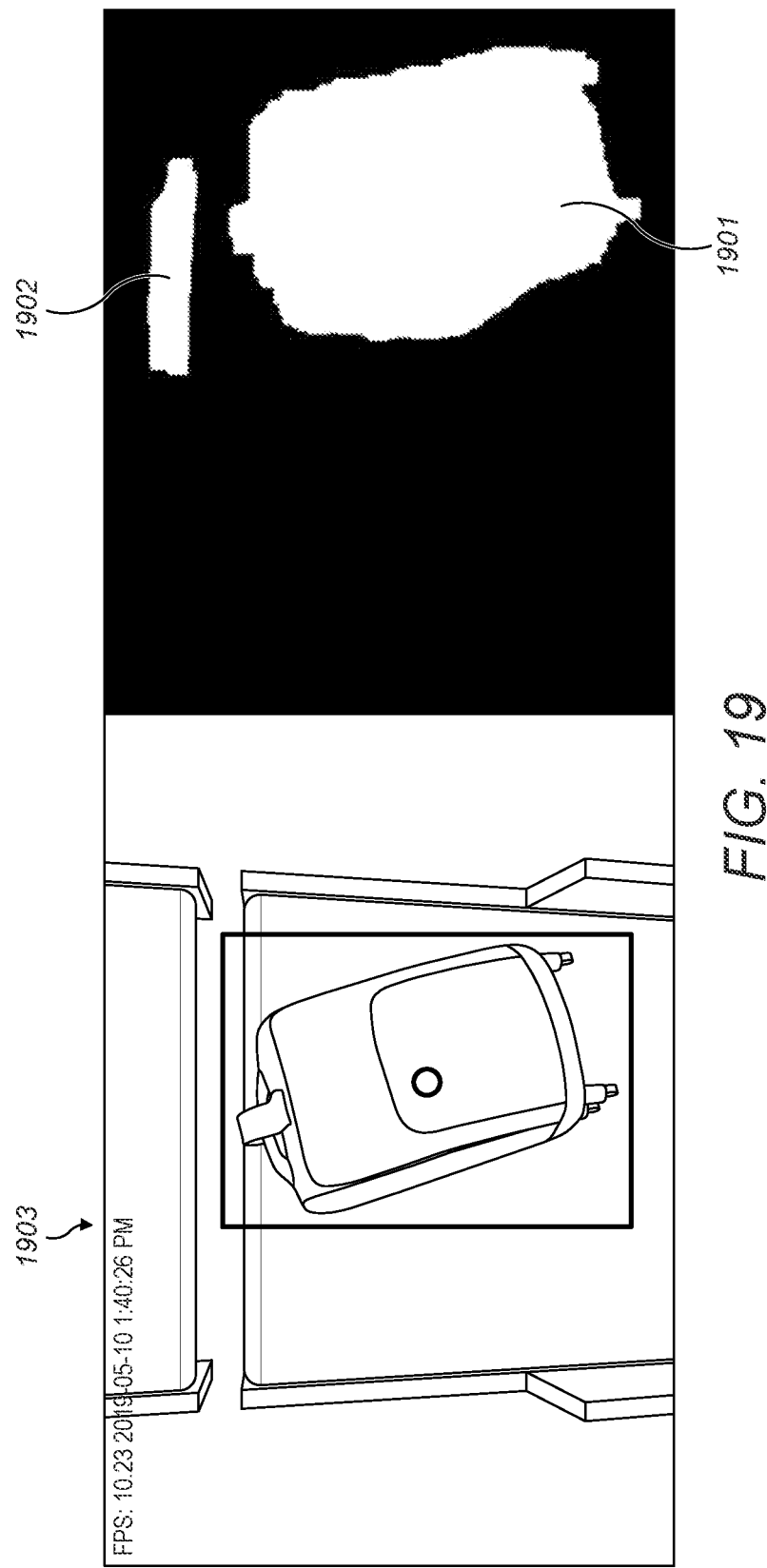

IMAGE PROCESSING SYSTEM AND METHOD

CROSS-REFERENCE TO RELATED APPLICATIONS

This application is a national stage application, filed under 35 U.S.C. § 371, of International Patent Application No. PCT/GB2020/053264, filed on Dec. 17, 2020, which claims the benefit of and priority of European Patent Application No. 20172992.8, filed May 5, 2020 and entitled "IMAGE PROCESSING SYSTEM AND METHOD," and Great Britain Application No. 1918893.7, filed Dec. 19, 2019 and entitled "IMAGE PROCESSING SYSTEM AND METHOD," which are incorporated by reference herein in their entirety.

FIELD OF THE INVENTION

This invention relates to systems and methods for positively identifying and monitoring entities that are captured in a series of images. Further, this invention relates to image processing and machine learning methods and systems. It is particularly, but not exclusively, concerned with uniquely identifying entities and recognizing anomalies associated with the entities.

BACKGROUND OF THE INVENTION

The Air Transport Industry (ATI) infrastructure requires developing efficient data connectivity and intelligence to cope with the predicted 8.2 billion journeys that are expected to be made in 2037. However, at this rate, current airport processes will not be able to handle the demand and airport infrastructure need to be strategically planned for a sustainable future. As passenger loads increase, using intelligent and automatic processes to provide more secure and efficient services becomes even more crucial to provide high-performing and extensive customer journey platforms.

The majority of object detection and biometric systems require faces and objects to be aligned with a camera field of view and maintaining a short separation distance from the camera. Biometric face detection systems often solely rely on face features to identify a passenger. In the majority of cameras the quality of the data is not sufficient to be used to biometrically identify every passenger in the camera field of view. For these systems, the ratio of false negatives will be high. In other scenarios, even with readily observable faces, the collected data is not sufficient enough to detect various aspects of an object. For example, the appearance and style of a passenger might provide information about the purpose of travel for that passenger. Another common issue with CCTV footage is that passengers can be obscured by others who are closer to the camera. However, algorithms that make use of a whole body representation can also suffer from the problem of a high ratio of false negative results.

It is therefore desirable to overcome or ameliorate the above limitations of the currently known processes for detecting and monitoring passengers and their belongings.

SUMMARY OF THE INVENTION

The invention is defined by the independent claims, to which reference is now made. Preferred features are laid out in the dependent claims.

According to a first aspect of the invention, there is provided an image processing system for identifying a user, the system comprising means for determining a region within a received image of a user wherein the region encloses the user, segmenting the region into a plurality of different sub regions, determining a characteristic vector for each of the sub regions, wherein each characteristic vector is defined by a plurality of characteristic feature values associated with each sub region, comparing each characteristic vector with a set of predetermined characteristic vectors, each of the set of predetermined characteristic vectors being associated with an identifier, and based on the comparison, associating each characteristic vector with the corresponding identifier associated with a selected one of the predetermined characteristic vectors or associating each characteristic vector with a new identifier.

Embodiments of the invention further comprise means for authorising the user for entry or exit via a gate based on the comparison. Other embodiments further comprises means for associating the identifier with passenger related information or a bag tag number. These features enable the embodiments of the invention to cooperate with accompanying infrastructure, and to enable an identified user be identified and matched with existing customer-related information.

In further embodiments, a first plurality of characteristic vectors are determined based on a first image of the user and a second plurality of characteristic vectors are determined based on a second image of the user. This enables characteristic vectors associated with a user to be generated from different images. This is advantageous if, for example, the head of a user is not captured in a first image but is captured in a second image.

Other embodiments further comprise means for selecting a subset of optimum characteristic vectors from the first plurality of characteristic vectors and the second plurality of characteristic vectors by identifying the characteristic vectors that have the largest value of a predetermined characteristic feature value. This enables embodiments of the invention to identify the characteristic vectors that contain the most amount of information or data. For example, embodiments of the invention may identify the characteristic vector that contains the most facial features by identifying the largest distance value between a user's eyes. When the eye distance value is at a maximum, the user is directly facing a camera, and so is showing a maximal amount of their fact to the camera.

In further embodiments, characteristic feature values are associated with one or more of: biometric data, face features, height, style, clothing, pose, gender, age, emotion, destination gate, or gesture recognition. This enables embodiments of the invention to uniquely identify a user and their belongings, as well as identifying user behaviours, and also enables the system to search for a target entity based on known characteristics of the entity.

Other embodiments further comprise means for associating the first image with a first predetermined location and associating the second image with a second predetermined location different from the first location. In further embodiments, the first predetermined location and the second predetermined location are each associated with one or more of customer car parks, airport terminal entrances and exits, airline check-in areas, check-in kiosks, terminal concourses, customer shopping and/or dining areas, passenger lounges, security and passport control areas, customs and excise areas, arrival lounges, departure lounges, and baggage processing areas.

According to a second aspect of the invention, there is provided an image processing method for identifying a user, the method comprising the steps of receiving an image of a user and determining a region within the image that encloses the user, segmenting the region into a plurality of different sub regions, determining a characteristic vector for each of the sub regions, wherein each characteristic vector is defined by a plurality of characteristic feature values associated with each sub region, comparing each characteristic feature value with a set of predetermined characteristic vectors, each of the set of predetermined characteristic vectors being associated with an identifier, based on the comparison, associating each characteristic vector with the corresponding identifier associated with a selected one of the predetermined characteristic vectors or associating each characteristic vector with a new identifier.

The advantages of the second aspect are the same as those described above for the first aspect.

Other embodiments of the invention further comprise authorising the user for entry or exit via a gate based on the comparison. Other embodiments, further comprise sending a message to actuate one or more infrastructure systems if any of the characteristic feature values exceeds the threshold value.

In further embodiments, the one or more infrastructure systems comprise one or more of: security barriers, public address systems, or emergency lighting systems.

Other embodiments further comprise associating the identifier with passenger related information or a bag tag number.

In further embodiments, each selected predetermined characteristic vector is chosen based on a degree of similarity between a particular characteristic vector and each of the plurality of predetermined characteristic vectors.

Other embodiments further comprise pre-processing each received image. In further embodiments, pre-processing comprises one or more of: sampling raw data, reducing background noise in the plurality of images, defining a region of interest within each image, removing the background of an image, and synchronising cameras.

Other embodiments further comprise determining a confidence score based on the degree of similarity between the particular characteristic vector and the selected predetermined characteristic vector, and/or flight related information associated with the selected predetermined characteristic vector.

Other embodiments according to either the first or the second aspect further comprise associating latitude, longitude and timestamp data with the location of the user in each received image, or further comprising means therefor.

In further embodiments according to either the first or the second aspect, the plurality of sub regions includes a first sub region associated with the head of a user, a second sub region associated with the body of a user, and a third sub region associated with the belongings accompanying a user. In further embodiments, characteristic feature values are associated with one or more of: biometric data, face features, height, style, clothing, pose, gender, age, emotion, destination gate, or gesture recognition.

BRIEF DESCRIPTION OF THE DRAWINGS

Embodiments of the invention will now be described, by way of example only, with reference the accompanying drawings, in which:

FIGS. 16A and 16B are exemplary images that illustrate removing noise from input camera data;

FIG. 19 is an exemplary image obtained from article localizing and tracking cameras.

DETAILED DESCRIPTION

Figure 1:
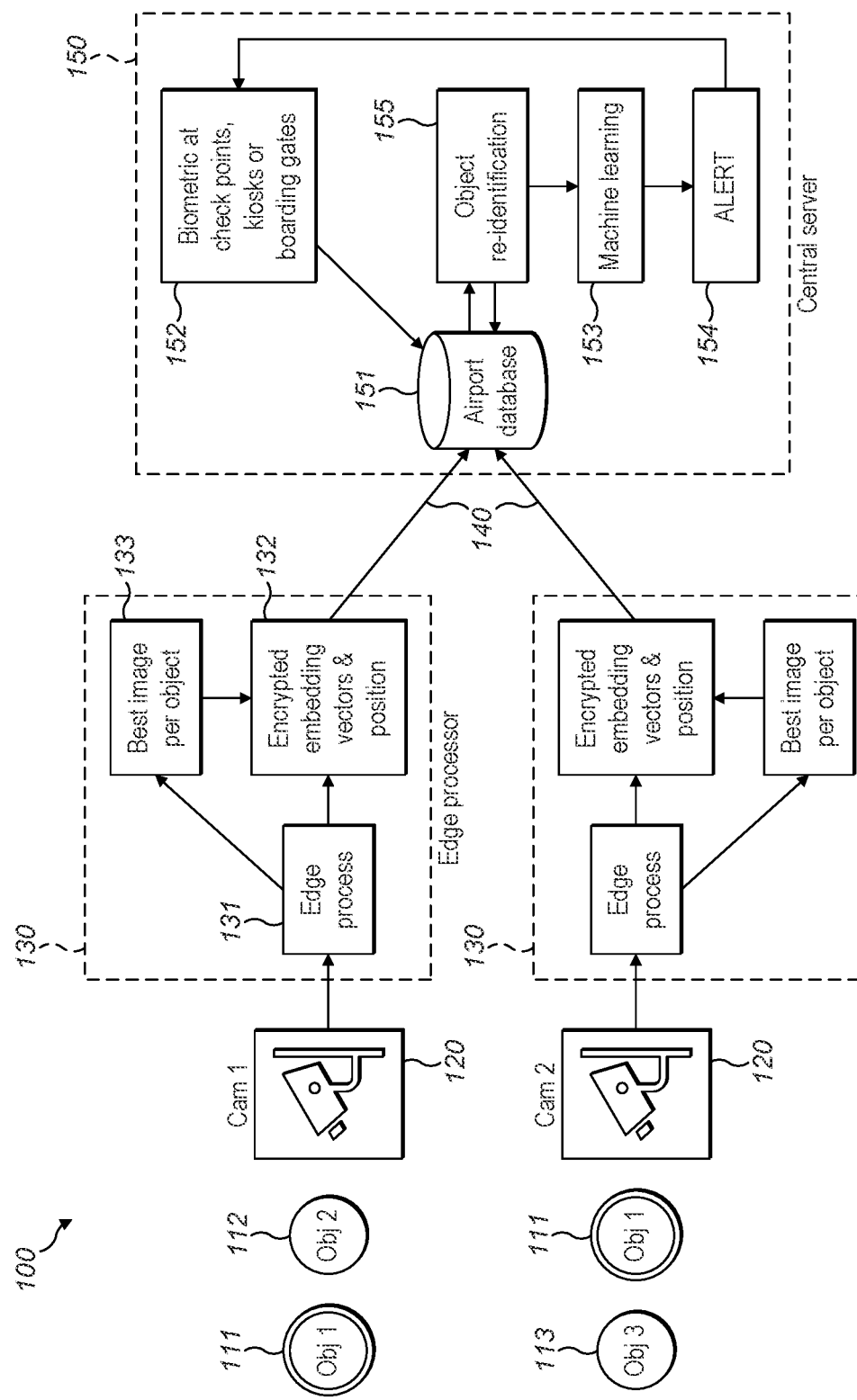
FIG. 1 is a schematic diagram showing the main functional components of an embodiment of the invention.

The following exemplary description is based on a system, apparatus, and method for use in the aviation industry. However, it will be appreciated that the invention may find application outside the aviation industry, including in other transportation industries, or delivery industries where items are transported between locations.

The following embodiments described may be implemented using a Python programming language using for example an OpenCV, TensorFlow, Keras libraries.

Embodiments of the invention solve the problems described above by providing a system that uses artificial intelligence to uniquely identify an entity, such as a passenger and their associated belongings, based on one or more images associated with the entity. Advantageously, the system is not required to capture face landmarks or to scan an article identifier in order to identify a particular entity. Instead, a plurality of characteristics associated with an entity are leveraged to locate and identify features of the entity using cameras and machine learning models. In this way, the system can automatically identify entities in a unique way by identifying a set of features inherently unique to the entity.

Embodiments of the invention provide means for recognizing and re-identifying an entity based on one or more image inputs, as described in more detail below. For example, given an input query image showing a passenger with an accompanying item of baggage, embodiments of the invention efficiently and effectively find other images of the same passenger or baggage, which may have been obtained at check-in. The query image is then processed to extract characteristics associated with the passenger and/or item. These characteristics may be recorded in a database and further processed to identify the passenger and/or item of baggage in order to assist in, for example, airport and boarding security or a baggage handling system.

Preferred embodiments of the claimed invention beneficially have the following advantages.

Firstly, embodiments of the claimed invention are able to dramatically reduce operational costs compared to the operational costs associated with implementing and maintaining known rectification systems for mishandled or abandoned articles of baggage. This is because there is no need for the labour-intensive manual examination of each article in order to correctly identify the article. Instead, machine learning methods are employed in an article recognition system that is able to perform feature detection and comparison from historical camera inputs. This enables the system to identify a set of unique characteristic features (such as a dent, sticker, added marker or unusual shape) associated with an article that is used to uniquely identify the article in place of a physical article identifier, such as a traditional printed barcode bag tag.

Secondly, embodiments of the claimed invention can easily be scaled up by adding more cameras so that the system can operate a larger area. The system is flexible and can the methods described herein can be extended for detecting the similarity of any object, the location of a device, and identifying anomalies within an observable environment, such as an airport terminal.

In addition, embodiments of the invention may have the following advantages over existing passenger surveillance, identification and tracking methods:

Passengers can be detected using facial characteristics in parallel with body and posture characteristics at a variety of different angles and alignments to a camera;
The cost of implementing embodiments of the invention is significantly lower than manual processing of surveillance systems;
The computer-based method is more efficient than manual identification systems, resulting in a reduced passenger waiting time and an improved passenger experience;
The stored images of passengers can be used for other purposes, such as providing customized services, quicker security checks, tracking baggage, protecting infrastructure and assets, and detecting anomalies including suspicious activity or accidents;
Easy integration with existing bag detection systems;
No reliance on labels or categories of detectable entities, leading to a flexible and adaptive system; and
The camera can capture positional information and a timestamp for every passenger and object and may optionally locate them within a virtual reality environment, such as an airport digital twin.

System Architecture

FIG. 1 shows a high level overview 100 of an embodiment of the invention.

In a collection and detection phase, images of entities 111 to 113 are captured by recording means, such as cameras 120, located in one or more different locations. For example, in the airport environment, cameras 120 may be located in one or more of: customer car parks, airport terminal entrances and exits, airline check-in areas, check-in kiosks, terminal concourses, customer shopping and/or dining areas, passenger lounges, security and passport control areas, customs and excise areas, arrival lounges, departure lounges, and baggage processing areas.

An initial image is captured of one or more entities, for example a person and their accompanying belongings when they first enter an observable environment. Examples of accompanying belongings may include: items of baggage such as hold luggage, cabin luggage, backpacks, laptop bags; and/or items of clothing such as hats and outer coats or jackets. Each entity within the initial image is associated with a unique identifier. The unique identifier is used to link one or more associated entities together. Further images of the one or more entities may be captured by cameras located throughout the environment to monitor the progress of the entities. Each image captured by the cameras is processed and analyzed in order to match the captured image with an earlier image of a particular entity.

In preferred embodiments, the cameras are positioned at a plurality of different locations. For example, the cameras may capture images of a queuing area or may be located within local infrastructure, such as a check-in desk, kiosk desk, a self-service bag drop machine, or an Automatic Tag Reading machine. In addition, the cameras may be positioned to capture any part of a journey through an environment by an entity, such as a passenger or an item of baggage.

It will be appreciated that each image captured by each camera comprises image sample values, or pixels. It will also be appreciated that many such cameras may be communicatively connected to a central computer or server in order for the server to analyze a plurality of images. Advantageously, this enables the system to uniquely identify a particular passenger or item of baggage, as further described below.

Once captured, the raw images are passed to an edge processor 130 for pre-processing of each image. The use of an edge processor has the following advantages. Firstly, the edge processor reduces the complexity of the received data to one or more embedding vectors that enable the system to perform pre-processing at a local level. This also enables the network infrastructure to transform the data in real-time thereby enabling the server to re identify the entity quickly and efficiently. Secondly, the edge processors increase the security of personal data because the one or more embedding vectors produced by the edge processors can be used to re-identify an entity but cannot be used to reconstruct the original image of the entity.

In preferred embodiments, the pre-processing steps may include sampling the raw data, reducing noise in the images, and defining a region of interest that bounds all or part of an entity in the image. This enables the system to detect, localize and track each entity.

Each image is processed and analyzed by a machine learning algorithm during an edge process 131 in order to identify one or more embedding vectors 132 associated with each identified entity 111 to 113. In preferred embodiments, the edge processor 130 processes an image to extract face landmarks of each identified face to produce one or more embedding vectors describing the biometric features associated with each identified face. Similarly, the edge processor 130 processes an image to produce an embedding vector for each object identified in the image. In addition, the edge processor 130 identifies the location of each identified entity. Further, in some embodiments the edge processor 130 includes a local memory that includes a set of images of each entity from a variety of different viewing angles.

In some embodiments, the edge processor 130 may select the best image 133 for each entity, in other words the highest quality image that shows the most number of characteristics for the entity, and use that best image 133 to further define the one or more embedding vectors 132. A best, or optimum, characteristic vector may be identified for a region associated with a user's head, body and accompanying objects to create a set of optimum characteristic vectors associated with the user. For example, an optimum characteristic vector may be identified for a passenger's whole body or object based on either the image with the largest size of the boundary box around the body or object; or, if the size of boundary is approximately the same for a number of images, identifying a plurality of images that produce embedding vectors that are substantially similar and selecting the embedding vector associated with the largest boundary box. A best, or optimal, characteristic vector may be selected for a passenger's face or posture based on the embedding vector that contains the most vector features, such as facial or posture features, that have the furthest distance from each other. In other words, the machine learning algorithm identifies features or points of interest (such as the eyes, or feet, or hands) when analyzing an image of a passenger. When the distance between certain features, such as the passenger's eyes, are at a maximum detected distance it means that the face or body of the passenger is most closely aligned with the camera view point, i.e. the passenger is looking squarely at the camera. Identifying the image in which the passenger is substantially facing the camera enables the maximum amount of features to be captured and included in the one or more embedding vectors. In some embodiments, a score may be associated with each embedding vector based on the distance between feature vector values. An embedding vector may be replaced with a "better" embedding vector if the embedding vector score is exceeded.

In some embodiments, the system generates a set of K characteristic vectors from K received images, where K represents the number of different viewing angles of a particular entity. For example, where K=4, the viewing angles may be of the front, back, left and right sides of the entity, with approximately 90 degrees separating each viewing angle. In other words, K defines how many distinct images must be detected for each entity and results in K different characteristic vectors that are each associated with the same entity. In preferred embodiments, a plurality of characteristic vectors associated with an entity are generated and grouped into a cluster. The cluster centroid is determined and the K closest characteristic vectors (in the Euclidean distance sense) are identified. This advantageously reduces noise and prevents the use of outlier data points.

Once the one or more embedding vectors 132 have been generated, they are encrypted along with the best images 133 of each entity by an encryption system on the edge processor 130 before being transmitted via messages 140 to a central server 150 where they are received by a database 151. In some embodiments the database 151 is structured such that data is stored according to its corresponding unique ID. In further embodiments, the database 151 is further structured such that data associated with a particular unique ID is stored according to the particular camera that the data derives from.

The database 151 also receives data from other external systems and data sources 152, such as biometric data obtained from security checkpoints, electronic check-in kiosks, electronic boarding gates, or automatic border control gates. The central server 150 maps all the data received from the cameras 130 and identifies recurring images of the same entity to produce a unified view of the entity. In some embodiments, the unified image can be mapped to a virtual environment such as a digital twin. The central server 150 also performs an analysis of the face landmarks and embedding vectors to produce metadata of each identified entity to provide a better passenger experience, and to tag an entity with a unique ID.

A machine learning core 153 analyses the information received by the database 151 and identifies the presence of any anomalies. Embodiments of the invention may monitor for anomalies in the following ways: first, monitoring secure zones that should only be accessed by certain authorized users, or by no users at all, and issuing an alert if an unauthorized user enters the secure zone; second, monitoring for an expected criteria or condition such as detecting the use of emergency lighting; and third using behavior detection models to monitor sudden unseen changes, for example by analyzing crowd behaviour and identifying if an area of the crowd starts running unexpectedly. If an anomaly is detected, an alert 154 is generated that may be sent to various external systems 152, such as security checkpoints, electronic check-in kiosks, electronic boarding gates, or automatic border control gates. In some embodiments, the type of alert issued may depend upon the type of anomaly detected. For example, if a gun or explosion are detected then a more urgent alert may be issued, and to a wider number of external systems and destination authorities. In preferred embodiments, the external systems 152 will prevent the entity that triggered the alert from proceeding further, for example by operating one or more security checkpoints, electronic check-in kiosks, electronic boarding gates, or automatic border control gates. In some embodiments, the machine learning core 153 also performs entity re-identification 155 to establish whether the same entity 111 has been detected at a plurality of different locations. This may be achieved by matching the identified entity to an existing unique ID, as further described below.

In some embodiments, the system 100 can be implemented on an autonomous scanning system that roams throughout an airport environment, for example by reading gate numbers in order to identify its location, and monitors objects and changes in the environment.

In the event that an anomaly is detected, a response phase 130 is initiated, as further described below.

Figure 2:
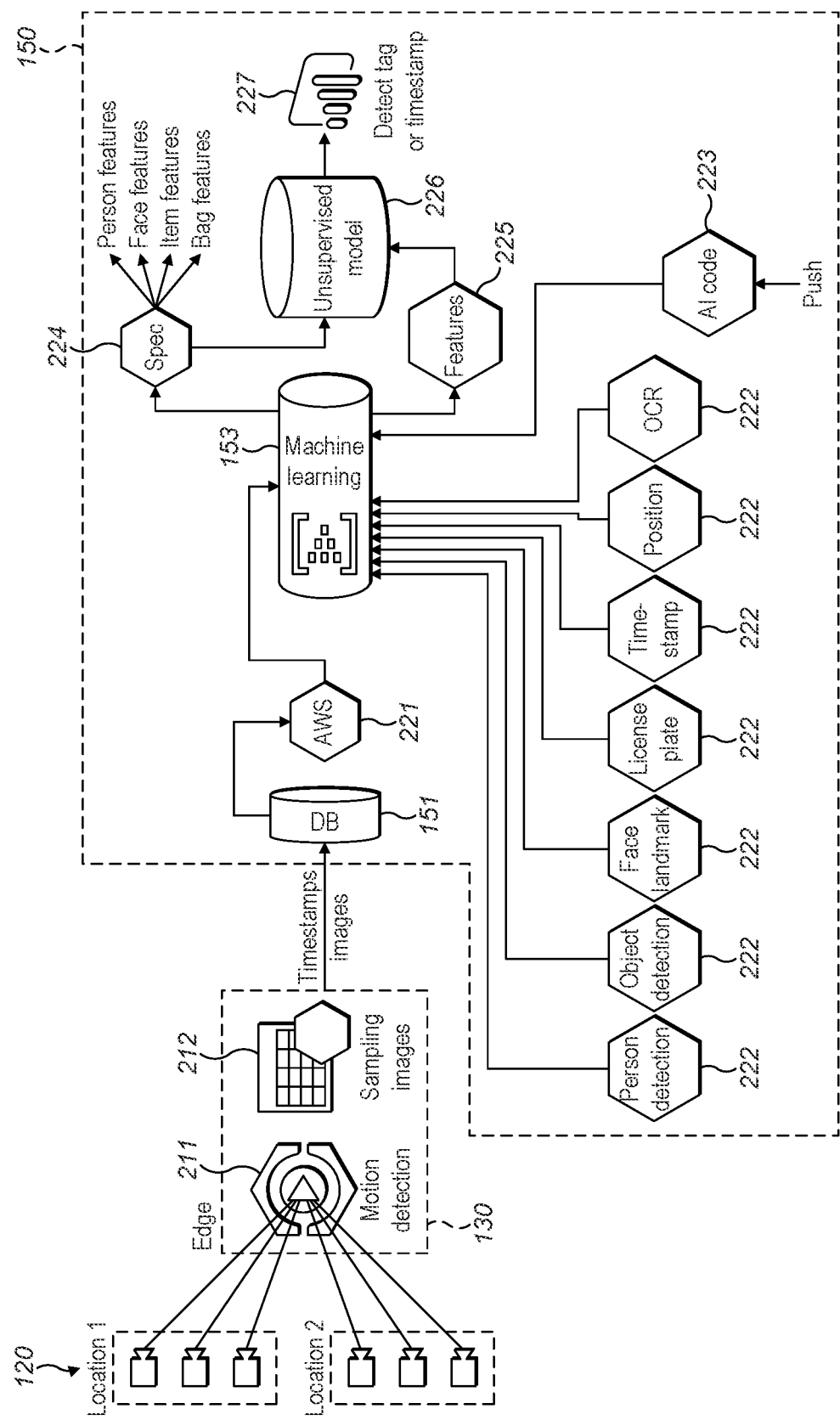
FIG. 2 is a schematic diagram showing further functional components of an embodiment of the invention.

FIG. 2 illustrates a more detailed version of the system architecture shown in FIG. 1. The system of FIG. 2 includes the cameras 120, edge processor 130 and central server 150 as described above.

Further to the above, the edge processor 130 comprises one or more pre-processing modules 211 and one or more feature extraction modules 212. The pre-processing modules 211 remove noise from the captured images of the entities and detect, localize and track each entity. The feature extraction module 212 processes each image and extracts the images with the highest number of identified features, associates each image with a timestamp and synchronizes the input of all cameras 120.

The server 150 receives and stores data and images received from cameras 120 and performs computational processes to determine the identifier associated with each entity and to use that identifier to track each entity, for example for the duration of a journey. The data exchanged by the system can either exist in a central or distributed architecture, whereby a user may have access to the entirety of the original data or a user is provided with an anonymized set of data which enables entities to be tracked without revealing personal information relating to passengers. Additionally, the system may encrypt the data to ensure that stored passenger-related information remains confidential.

In preferred embodiments, the server 150 comprises a database 151 and AWS module 221, where data can be uploaded to be stored or further analyzed. In some embodiments, the database and AWS module 221 are cloud-based.

The system further comprises external sources of data 222 that store supplementary data that can be added to the image or its metadata. In the embodiment shown in FIG. 4, the external sources of data are provided by a Person Detection module, an Object Detection module, a Face Landmark module, a Licence Plate module, a Timestamp module, a Position module, and an OCR module. In preferred embodiments, the supplementary data includes license plate tag number, timestamp of the recorded videos, bag color using an extra image processing method, and an OCR algorithm that extracts written digits and characters of images as a feature.

In preferred embodiments, the server 150 further comprises one or more main machine learning cores 153 that include a first set of machine learning algorithms to extract feature vectors from each captured image and identify an associated customer ID from the extracted feature vector.

The machine learning cores may also include a second set of machine learning algorithms that can detect abnormalities, i.e. anomalies. In the event that the system 100 identifies an anomaly, the system will generate an alert that is sent as a message to inform the related authority as further described below.

The server further comprises one or more portals 223, such as an AI Code portal, that enable updating and downloading results of the machine learning core 153 remotely and one or more descriptor outputs 224 that produce the descriptive labels produced by the machine learning model 153. For example, the descriptor outputs can be paired or matched with a corresponding passenger ID in order to categorize passengers according to their age, gender or an emotion group. The output can also be used for generating an IATA code, which categorizes an article of baggage, in order to use semi-supervised methods for identifying missing bags. One or more non-descriptive vectors 225 may be produced that are based on the non-descriptive features of an entity. The non-descriptive vectors 225 are used to identify the closest images to a selected image of an entity, as further described below.

The server may further comprise one or more unsupervised model modules 226 which use algorithms such as a nearest neighbor-based model to identify the closest images to a selected image of an entity based on the Euclidean distances between a feature vector of the selected image and the feature vectors of other images to uniquely identify similar entities, as further described below. In this context, unsupervised learning is a branch of machine learning that groups data that has not been labelled or categorized by identifying commonalities in the data.

Finally, in preferred embodiments the server further comprises one or more reverse mapping modules 227 that uniquely identify an entity from the identified closest image using lookup tables, as further described below.

In preferred embodiments, a wired or wireless communications network is used to communicatively couple the functional components shown in FIG. 2 together, thereby allowing data exchange between each of the components. The network may also be used to receive an image of a passenger or an item captured by a camera or other recording devices. In all cases, wired or wireless communications protocols or CPU or GPU processes may be used to exchange information or process data in the functional components.

In preferred embodiments of the invention, the messaging or communication between different functional components of the system architecture is performed using the XML data format and programing language. However, this is exemplary, and other programming languages or data formats may be used, such as REST\JSON API calls. These may be communicated over HTTPS using wired or wireless communications protocols which will be known to the skilled person. Machine learning and computer vision methods and libraries may also be advantageously used. Pictures and videos obtained from cameras within the system may also be streamed to a local server or a cloud based data center.

In preferred embodiments, the different functional components described below may communicate with each other using wired (including Power Over Ethernet—PoE) or wireless communication protocols which will be known to the skilled person. The protocols may transmit service calls, and hence data or information between these components. Data within the calls is usually in the form of an alpha-numeric string which is communicated using wired or wireless communication protocols.

The system may comprise one or more different models, such as computer vision models and machine learning methods. In preferred embodiments, these models may include pre processing, object tracking and extraction, pattern matching. person and face detection. object recognition, posture recognition, and the like. Each of the models may run on a separate computer processor or server, although it will be appreciated that some embodiments of the invention may in principle run on a single computer or server.

In preferred embodiments, the processes described above may be performed in real-time using a centralized processor and receiving data at the centralized processor. However, one or more edge computing processors may be used to extract only data that is necessary to be transmitted to the centralized processor. This may advantageously improve the security of the network data over the network while reducing the network bandwidth requirements to a fraction of what would be otherwise required for raw data transfer. In some embodiments, data and metadata described above may be shared to a cloud base processing system to enable, for example, the identification and tracking of entities in multiple locations across the globe.

Figure 4:
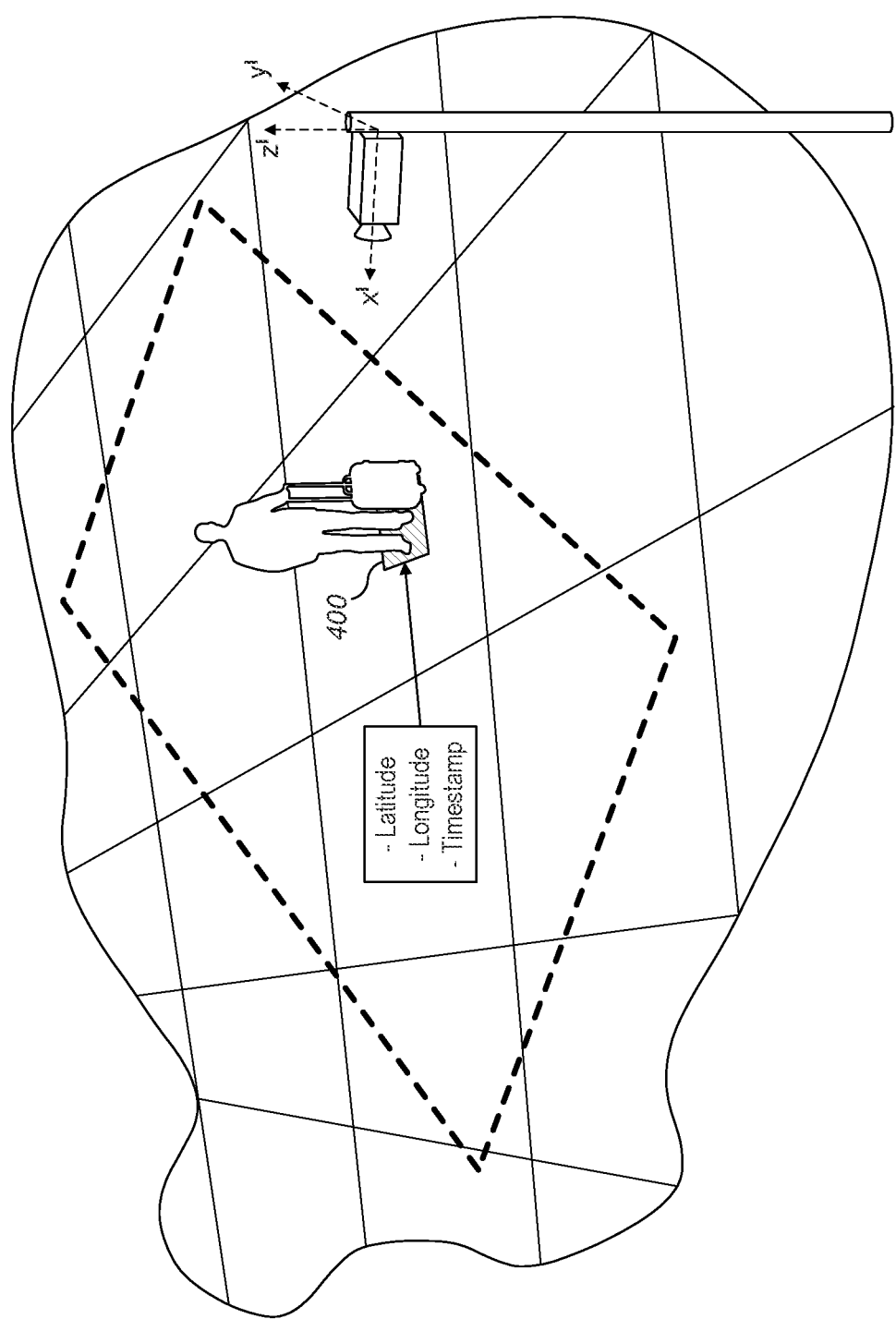
FIG. 4 is an exemplary schematic illustration showing the extraction of timestamp and positional data for an entity.

In preferred embodiments, a wired or wireless communications network is used to communicatively couple one or more of the functional components shown in FIG. 4 together, thereby allowing data exchange between each of the component(s). The network may also be used to receive an image of a bag captured by a camera or other recording devices. In all cases, wired or wireless communications protocols or CPU or GPU processes may be used to exchange information or process data in the functional components.

In preferred embodiments of the invention, the camera array or recording means are positioned within an airport environment such as at a bag drop kiosk, desk, a self-service bag drop machine, on an Automatic Tag Reading machine or at any point throughout an airport terminus. It will be appreciated that each image comprises sample values or pixels. It will be appreciated that many such cameras or recording means may be coupled to a central computer or server to facilitate the unique identification of each observed entity, as will be described in further detail below.

The computer or server comprises machine learning, deep learning and neural networks. Such machine learning and neural networks are well known to the skilled person and comprise a plurality of interconnected nodes. This may be provided a web-service cloud server. In preferred embodiments, the nodes are arranged in a plurality of layers ($L_1$, $L_2$, ... $L_N$) which form a backbone neural network. For more specialized feature extraction of images, a plurality of feature abstraction layers is coupled to the backbone neural network to form a deep learning model. The pre-processing method determines a bounding box which defines a region or area within an image which encloses the entity.

Preferred embodiments of the invention are able to comprise part of an alerting system that provides a live view and location of each entity and sends an alert when an anomaly is detected.

System Configuration:

As indicated above, the system 100 comprises an array of cameras 120 configured to capture images of one or more entities. In some embodiments, the cameras 120 may provide high quality images by reducing the number of unnecessary background pixels and improving the capture of informative features such as the faces of passengers or wheels of a bag. For example, the shutter speed and other image capturing configurations are set to capture the highest quality data, and the storage format is set as the highest quality possible when considering the networking and local storage capacities. In some embodiments, a data or image compression method is used to improve the performance of the transfer and storage of data.

Each camera captures images of every entity that passes by its field of view and creates a dataset of images for processing. Each image is timestamped and associated with location information so that the exact location of each entity can be tracked by the system. In preferred embodiments, the location information may be latitude and longitude coordinates, or x— and y— coordinates that are defined in relation to a local point of origin.

Each image in the dataset is analyzed to identify each entity and associate a unique identity number with each entity. The system may match a plurality of images to the same unique identify number if the images are identified to be associated with the same entity.

Figure 3:
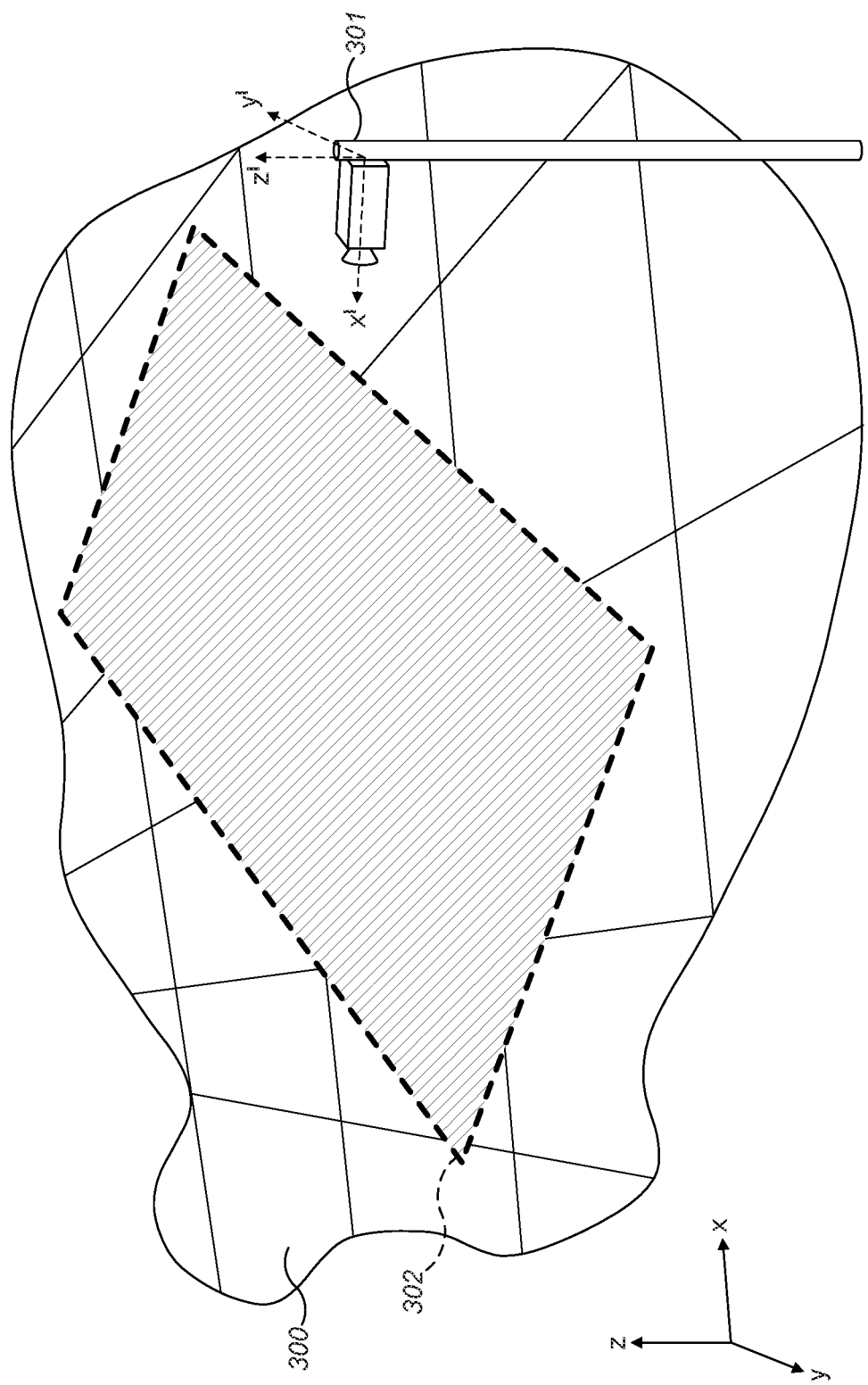
FIG. 3 is an exemplary schematic illustration showing the field of view for a camera.

FIG. 3 shows an observable environment 300 where a number of cameras 120 may be deployed. As shown in FIG. 3, a first camera 301 is orientated to capture videos or a sequence of images and data relating to one or more entities within the observable environment 300. The camera has a field of view which may be limited to a region of interest 302. In some embodiments, the region of interest can be maximized to equal the field of view for the camera.

As described above, a plurality of cameras 301 may be located throughout a customer journey within a particular environment, for example at an arrival and destination location. In preferred embodiments, each camera provides data relating to the angle and location of the camera's field of view to enable to calculation of the relative positions of each entity within the field of view. In addition, in preferred embodiments the recorded images are also associated with a corresponding timestamp.

In alternative embodiments, the cameras 120 can be replaced or equipped with other types of sensors, such as radar, LiDAR, 3D cameras, time-of-flight sensors and stereo cameras. In further embodiments, one or more cameras 120 may be installed on an autonomous robot in order to create a 3D view of the environment 300 by obtaining location information from the autonomous robot. The 3D view may then be combined with the images obtained from real-time cameras and sensors.

In preferred embodiments, shown in FIG. 4, a machine learning algorithm may use the angle of a camera 120 or the relative position of the camera to visible indicators located on the floor to estimate the distance and relative position of an observed entity. The positional data and timestamp 400 may be stored on the edge module or may be sent to the central server for further processing, metadata creation, or to create a virtual reality or augmented reality version of the environment. This may also advantageously enable the system to limit the extent of a search when attempting to re-identify a passenger, as further described below.

Figure 5:
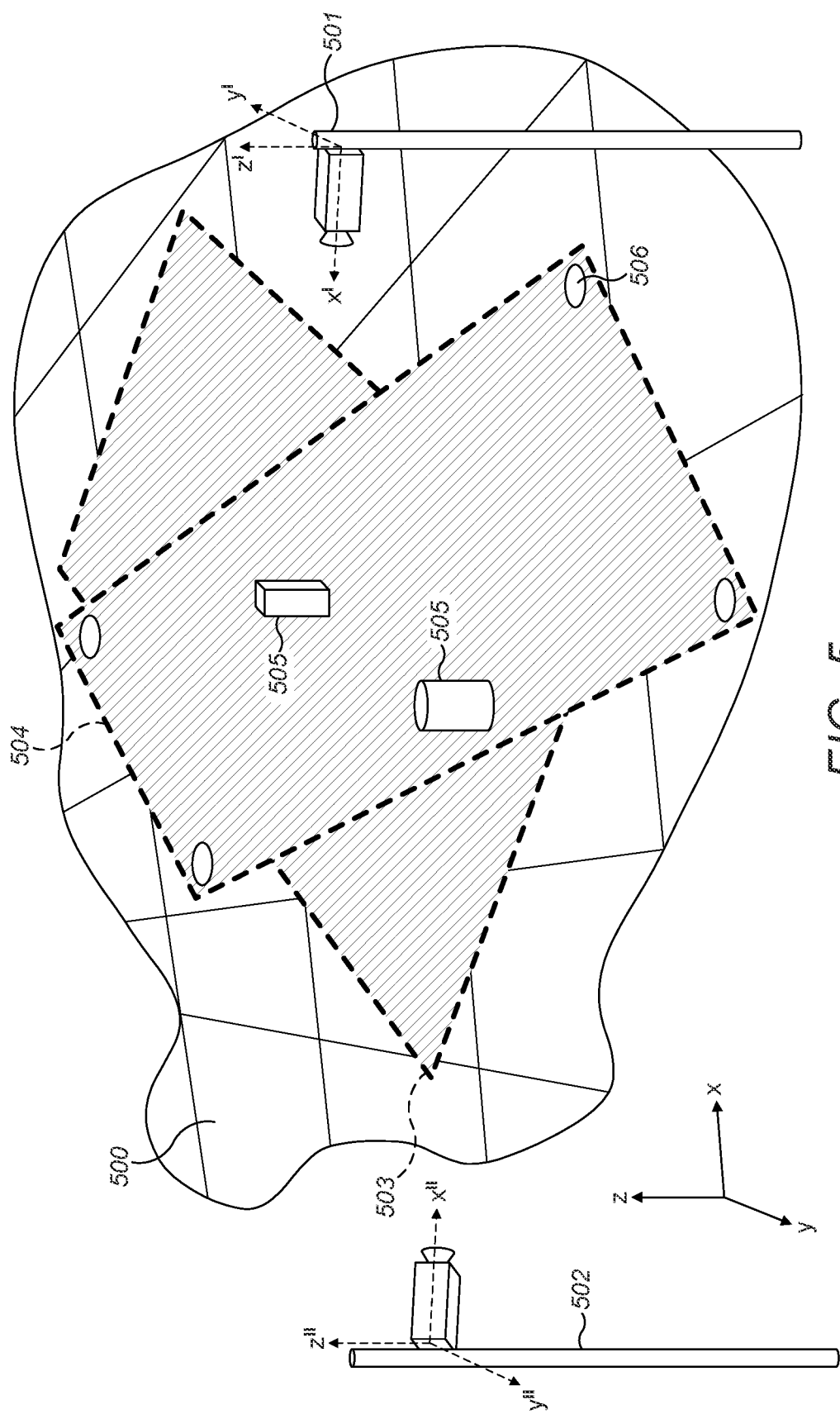
FIG. 5 is an exemplary schematic illustration showing how cameras with overlapping fields of view can be calibrated.

In some embodiments, the cameras 120 may be calibrated. FIG. 5 shows an observable environment 500 where a region of interest 504 is demarcated by boundary indicia 506. In some embodiments, the boundary indicia 506 may be signs located on the floor and which are detectable by the cameras 120. The boundary indicia 506 provide a fixed reference point to enable the view of each camera to be calibrated. Where a plurality of cameras are employed, the field of view of a first camera 304 may overlap with another field of view 503. In order to avoid replicating the identification of entities, in preferred embodiments stationary objects that can be seen by each camera are used to adjust the overlap between the field of view of each camera by using the corners of the relatively stationary objects to calibrate the cameras 120.

As indicated above, one or more machine learning algorithms, or models, may be used to uniquely identify an entity, determine whether that entity constitutes a cause for concern, and take appropriate action if the entity is considered a cause for concern.

These models are described in more detail below and may include known machine learning models such as Triplet networks and Siamese networks. In some embodiments, the models are trained using a training data set of images from a variety of different locations and/or from various angle viewpoint of cameras. In addition, the training data may be associated with values defining a timestamp value in order to uniquely identify an entity.

The machine learning models are trained to identify various characteristics associated with an image, including one or more passengers and/or objects. In preferred embodiments, this is achieved using one or more specific sub-models.

Once one or more of the models have been trained using the training data, embodiments of the invention use one or more trained models to identify entities, such as passengers or articles of baggage, within each image by extracting, mapping and comparing unique features associated with the entity.

Each model may be trained using a convolutional neural network with a plurality of nodes. Each node has an associated weight. The neural network usually has one or more nodes forming an input layer and one or more nodes forming an output layer. Accordingly, the model may be defined by the neural network architecture with parameters defined by the weights.

Thus, it will be appreciated that the neural network is trained. However, training of neural networks is well known to the skilled person, and therefore will not be described in further detail.

For example, a type model may be trained to categorise an image of bag according to one or more of the following predetermined categories shown below in Table 1:

TABLE 1

Type Precisions of different baggage classifications determined according to an embodiment of the invention.

| Label | Name | Precision | N |
|---|---|---|---|
| T01 | Horizontal design Hard Shell | 0.000 | 6 |
| T02 | Upright design | 0.889 | 476 |
| T03 | Horizontal design suitcase Non-expandable | 0.000 | 3 |
| T05 | Horizontal design suitcase Expandable | 0.000 | 5 |
| T09 | Plastic/Laundry Bag | 0.000 | 3 |
| T10 | Box | 0.939 | 33 |
| T12 | Storage Container | 0.000 | 5 |
| T20 | Garment Bag/Suit Carrier | 0.000 | 5 |
| T22 | Upright design, soft material | 0.000 | 26 |
| T22D | Upright design, combined hard and soft material | 0.944 | 748 |
| T22R | Upright design, hard material | 0.932 | 2062 |
| T25 | Duffel/Sport Bag | 0.379 | 29 |
| T26 | Lap Top/Overnight Bag | 0.357 | 42 |
| T27 | Expandable upright | 0.397 | 267 |
| T28 | Matted woven bag | 0.000 | 2 |
| T29 | Backpack/Rucksack | 0.083 | 12 |

In addition to the types identified in Table 2, the following additional bag categories may be defined. A label of Type 23 indicates that the bag is a horizontal design suitcase. A label of Type 6 indicates that the bag is a brief case. A label of Type 7 indicates that the bag is a document case. A label of Type 8 indicates that the bag is a military style bag. However, currently, there are no bag types indicated by the labels Type 4, Type 11, Type 13-19, Type 21, or Type 24.

In Table 1, N defines the number of predictions for each bag category or name, for example "Upright design", and the label is a standard labelling convention used in the aviation industry. Preferably, a filtering process may be used to remove very dark images based on an average brightness of pixels associated with the image.

It will be appreciated that a similar system of categorizing characteristic features of a passenger' face, body or other accompanying belongings may be achieved in substantially the same manner as described above for an object.

System Operation Overview

As described in further detail below, a machine learning algorithm generates a unique ID for each newly-identified passenger who enters an airport. This is achieved by analyzing an image of a passenger to identify a first region that includes the passenger and a plurality of sub-regions that bound key features of the passenger, such as the passenger's face or body. One or more embedding vectors are generated for each of these sub-regions based on the passengers characteristic features. One or more embedding vectors are also generated based on the characteristic features of any items that accompany the passenger, such as items of baggage. Each of these generated embedding vectors is matched with the unique ID associated with the passenger. Additionally, the embedding vectors may be updated if the system can obtain better data for any of the characteristic features associated with the passenger or their accompanying items.

The system may interface with biometric systems, such as a passport check point, to verify the passenger's identity. The passenger's identity may be stored in a database along with the assigned unique ID for future use, for example at immigration and aircraft boarding points. Accordingly, the system can be leveraged to provide personalized services, such as enabling a recognized and verified passenger to proceed through security without requiring a boarding pass or to board a flight without requiring a passport check.

Figure 6:
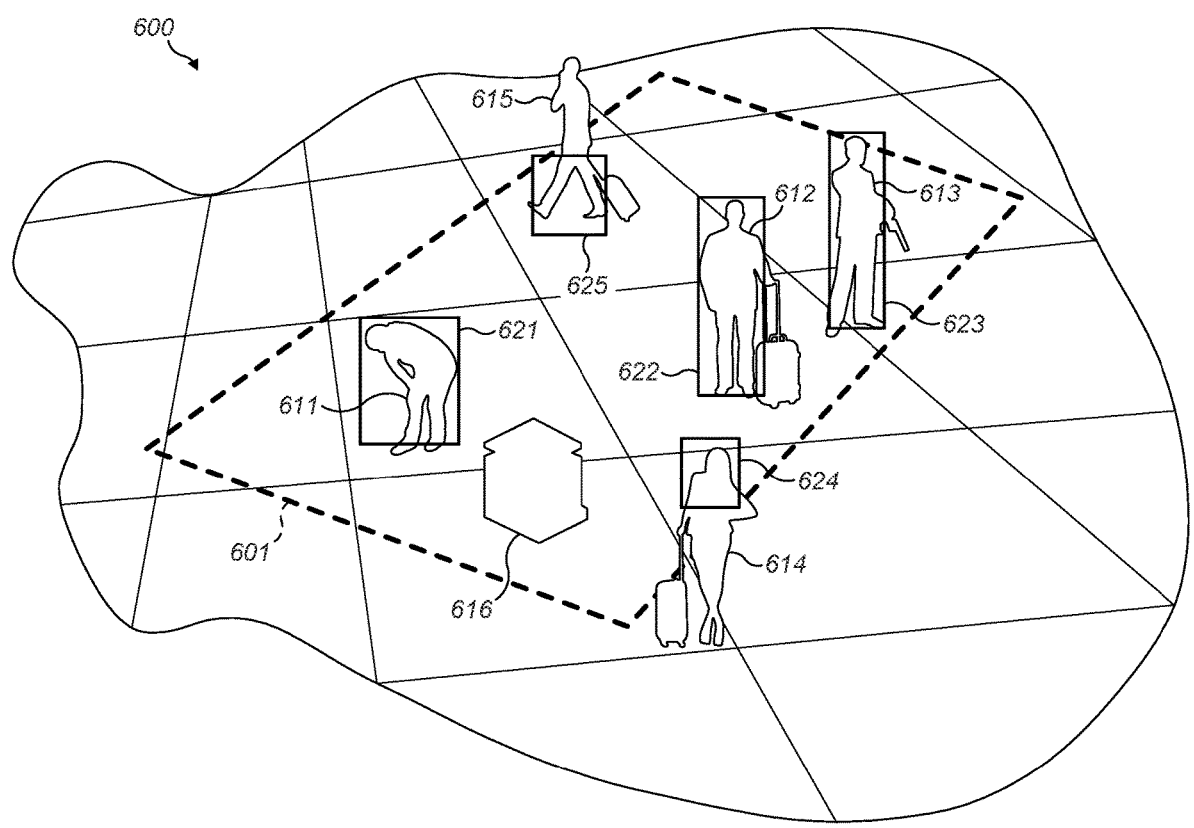
FIG. 6 is an exemplary schematic illustration showing the detection of a human body and pose.

FIG. 6 shows an example observable environment 600 that includes a region of interest 601 (also known as an image boundary) within an observable field of view. In the example observable environment 600 shown in FIG. 6, there are five regions (not shown) that each contain an observable passenger within the image boundary 601. In a first stage, the system 100 may identify a sub-region that encloses the entire body of a passenger within the image boundary 601 for a particular camera. This may be achieved with a body-feature extraction module. As will be seen from FIG. 6, three FIGS. 611, 612, 613 are wholly within the boundary 601 while two FIGS. 614, 615 are partially within the boundary. Accordingly, each of the five figures are at least partially bounded by sub-region boundary boxes 621 to 625 respectively. An inanimate object 616 has not been identified using the body-feature extraction module, and so is not bounded by a boundary box.

The system 100 identifies known patterns that represent the human body and uses those patterns to generate an embedding vector for each identified passenger within the region of interest 601.

A unique ID is associated with each embedding vector. The images of each figure may also be used for pose-estimation and for detecting anomalies, as further described below.

The system 100 uses machine learning techniques to identify body characteristics of each identified passenger, such as clothing, posture, and walking style. The body characteristics may be used to infer the behaviour of a particular passenger. For example, the body characteristics may be used to identify a predicted journey path that the passenger is presently taking. The system 100 may establish a destination of the passenger, such as a departure gate, and calculate an optimal path that the passenger should take to arrive at the departure gate.

The system 100 may also detect abnormal behaviour (i.e. anomalies) using the body characteristics. For example, the posture can be used to detect if someone is having a heart-attack, or is about to commence aggressive, threatening or dangerous behaviour. Alternatively, the system 100 may detect abnormal behaviour if the passenger significantly deviates from the calculated optimal path to an expected destination.

Figure 7:
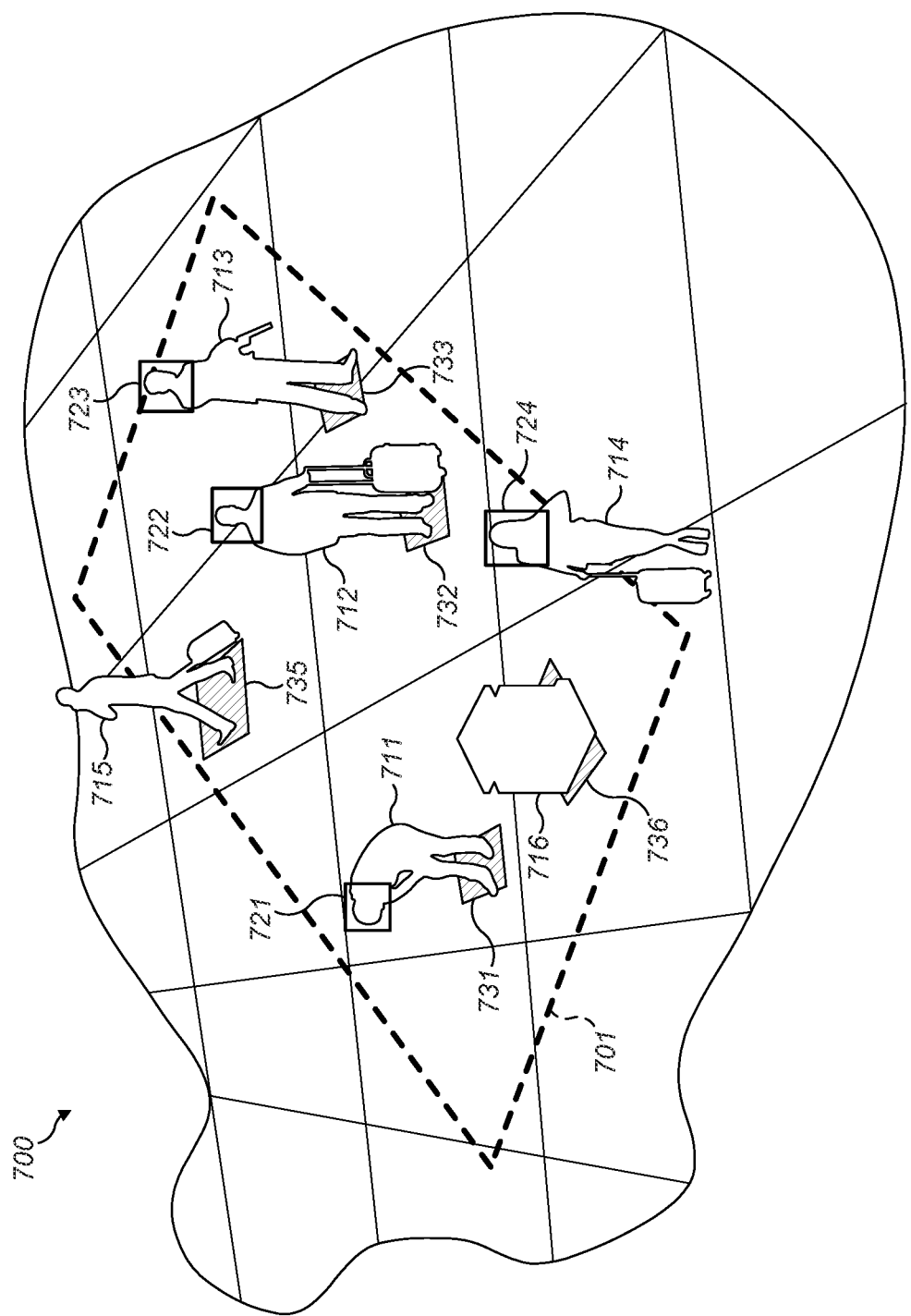
FIG. 7 is an exemplary schematic illustration showing the detection of a human face.

FIG. 7 shows the same observable environment as FIG. 6. In the example observable environment 700 shown in FIG. 7, there are five figures, but only four observable faces within the region of interest 701.

As shown in FIG. 7, in some embodiments, the system 100 performs a further step of identifying a sub-region that encloses the characteristic features of a passengers face, also known as feature landmarks, that are identified within the region of interest 701. This may be achieved with a face-feature extraction module. The face landmarks may be used for later biometric identification. The face-feature extraction module may be located on either the edge-side or the central server-side in order to detect observable faces. Three FIGS. 711, 712, 713 are wholly within the region of interest; one FIG. 714 has their head within the region of interest 701 while at least part of their body is outside the region of interest 701: and a final FIG. 715 has their head is outside the region of interest 701. Accordingly, the head regions of each of FIGS. 711 to 714 are bounded by sub-region boundary boxes 721 to 724 respectively. FIG. 715 and inanimate object 716 are not associated with a boundary box as they have not been identified using the face-feature extraction module.

Similarly as before, the system 100 generates the positional data, a timestamp and an embedding vector for each identified head region within the region of interest 701.

Each embedding vector is associated with a unique ID, and may be mapped to an existing unique ID as further described below.

The system 100 uses machine learning techniques to identify facial characteristics of each identified passenger, such as gender, emotion, sentiment, and age group, which may be used to infer the identity of the particular passenger. For example, the facial characteristics may be compared to known biometric data to verify the identity of a passenger.

Figure 8:
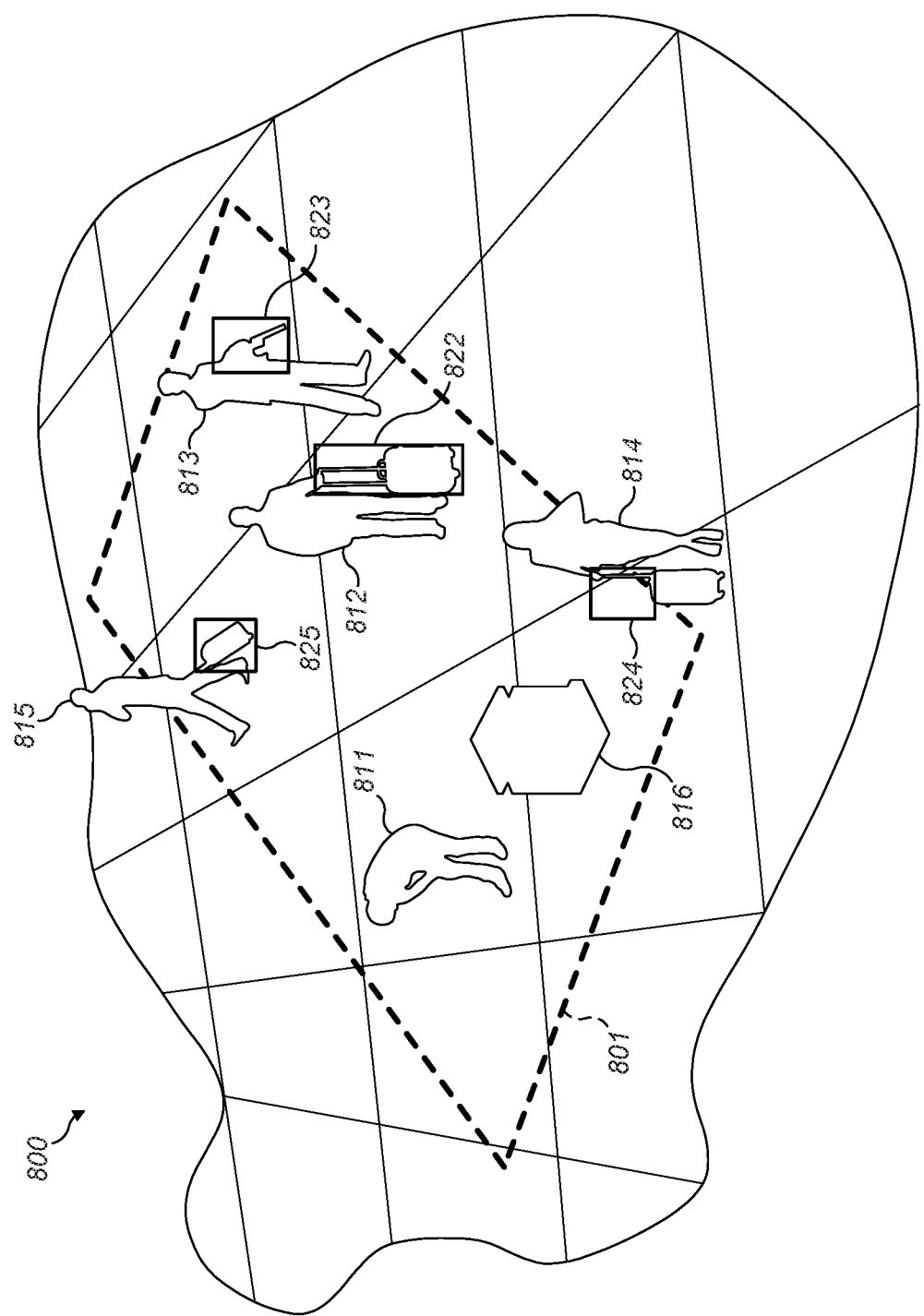
FIG. 8 is an exemplary schematic illustration showing the detection of items associated with a human.

FIG. 8 shows the same observable environment as FIG. 6 and FIG. 7. As shown in FIG. 8, in some embodiments, the system 100 may identify and enclose the characteristic features of an item that is accompanying a passenger using an item-feature extraction module. The system may determine that a particular item belongs to a passenger by identifying whether the item and the passenger move together within a certain proximity threshold to each other.

The item-feature extraction module may be located on either the edge-side or the central server-side in order to detect observable items. In the example observable environment 800 shown in FIG. 8, there are four observable items within the region of interest 801. FIG. 811 does not have any accompanying items. FIG. 812 has an accompanying item 822 that is wholly within the region of interest 801. FIG. 813 also has an accompanying item 823 that is wholly within the region of interest 801. FIG. 814 has an accompanying item 824 that is partially within the region of interest 801. Finally, FIG. 815 has an accompanying item 825 that is wholly within the region of interest 801. Inanimate object 8016 has not been identified using the item-feature extraction module, as it is an item of infrastructure and so is not associated with an accompanying passenger.

As above, the system 100 generates the positional data, a timestamp, and an embedding vector for each identified item within the region of interest 801. Each embedding vector is paired with a unique ID associated with a new passenger, or may be matched to an existing unique ID as further described below.

The system 100 can monitor items of infrastructure and issue an alert in case of an anomaly, for example if they have been moved impermissibly. Further, correlating accompanying belongings to a passenger advantageously enables the system to retrieve the identity and passenger-related information associated with an article of baggage that has been left unattended.

The system 100 uses machine learning techniques to identify item characteristics of each identified item, such as baggage or prohibited objects, and to associated the identified items with the same unique ID as the nearest the passenger to the object. This may be achieved as described above with a type model to identify different types of prohibited items, as well as categories of baggage.

The system 100 may detect anomalies using the item characteristics and the associated unique ID. For example, if the unique ID of the passenger checking in a bag does not match the unique ID of the passenger collecting the bag at a pick-up location, then the system may detected abnormal behaviour. In addition, if the system identifies an object to be the same shape as a prohibited object, such as a weapon, then an anomaly alert may be sent automatically.

In addition, the system 100 can detect whether the carry-on bags associated with an identified passenger will fit within the cabin of an aircraft. This may be achieved by firstly retrieving the unique ID associated with the item of baggage and identifying passenger-related information associated with the unique ID. The passenger-related information may include flight details and so the system 100 would be able to identify the aircraft type and aircraft specification for the flight the passenger is booked onto.

Figure 9:
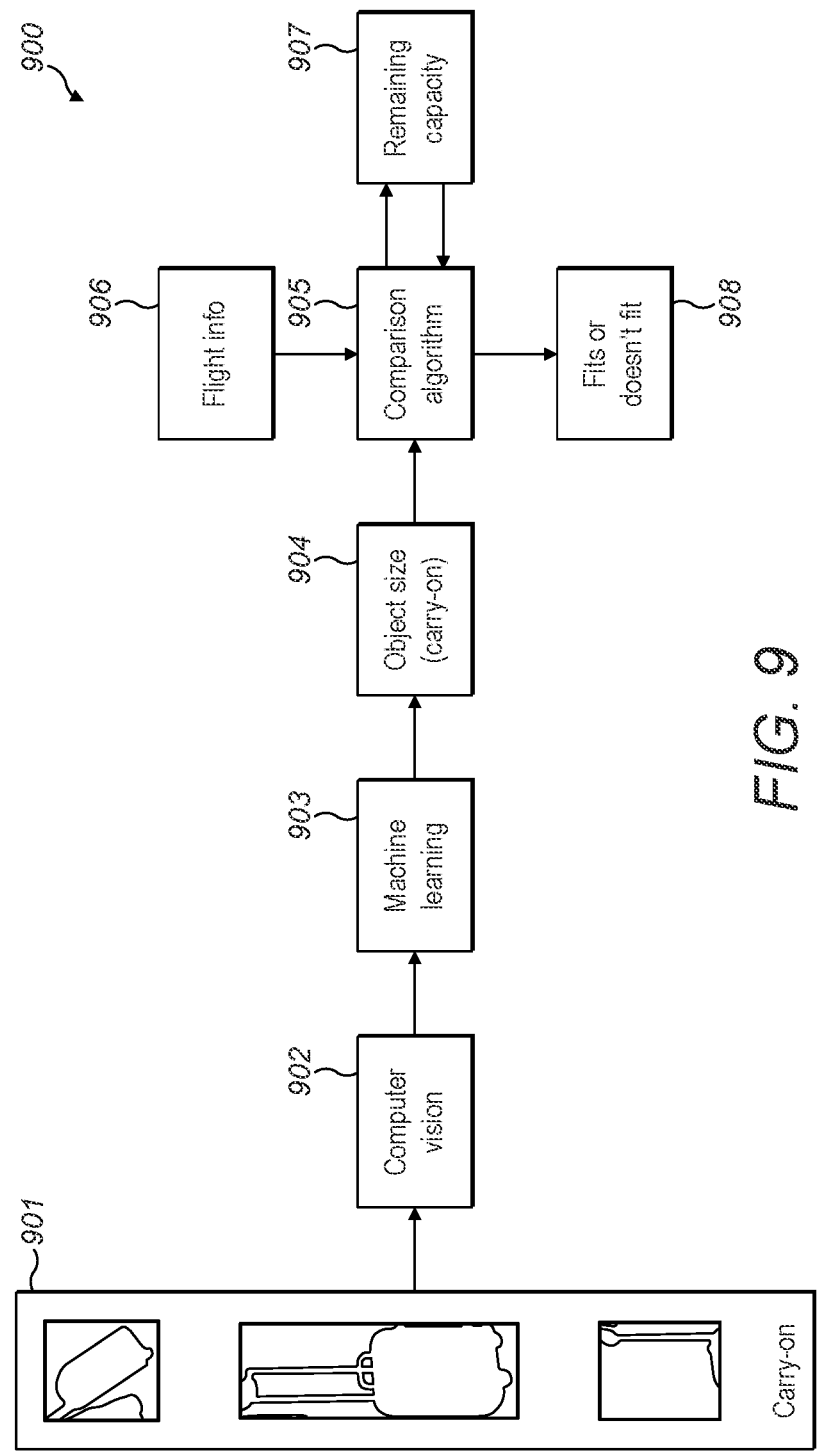
FIG. 9 is a schematic diagram showing how the system may determine whether a carry-on item would fit in an aircraft cabin.

In preferred embodiments, shown in FIG. 9, the system 100 may determine whether an identified item of carry-on baggage 901 would fit into the cabin space. This may be achieved using computer vision 902 and machine learning 903 techniques to define a virtual box associated with a particular camera that corresponds to the maximum allowable size for carry-on baggage for the field of view for the particular camera. Scaling factors can be applied based on the baggage's relative proximity to a number of markers located a predefined distance from the camera. This allows the system 100 to provide an accurate estimated size 904 of the item of carry-on baggage. Next, a comparison algorithm 905 identifies whether there is any available room in the cabin for a particular passenger's carry on baggage. This may be achieved by firstly using the calibrated cameras to estimate the size of the carry-on baggage, as described above, and secondly calculating the total available space and deducting the total amount of space occupied by the carry-on baggage that is either already on board or required by a number of passengers further ahead in a queue to board the aircraft. This may be achieved by identifying the passenger or item of baggage and retrieving the flight information 906 associated with the passenger, retrieving a remaining capacity 907 for the flight, and outputting a result 908 indicating whether the bag fits or does not fit into the remaining space available. If the bag fits, the system 100 may update the remaining capacity 907.

When the maximum allowable amount of carry-on baggage is reached for a particular flight, an alert may be issued informing the relevant authority to stop accepting more carry-on baggage in the cabin.

In alternative embodiments, the comparison algorithm 905 may compare the size of a bag with a maximum storage space allowable for the cabin hold. If the bag is too large, an alert may be issued.

Similarly, the system 100 may identify item characteristics for items of infrastructure and use machine learning techniques to track those assets. The system 100 may detect an anomaly if the asset is moved, or if the item characteristics indicate that the asset is malfunctioning, or is a potential danger to passengers around it. For example, the system 100 may detect that an asset is releasing smoke, thereby indicating that the asset is at risk of catching fire.

Accordingly, for a plurality of images of a passenger, the system 100 will generate a plurality of embedding vectors associated with the passenger and their accompanying belongings.

Figure 10:
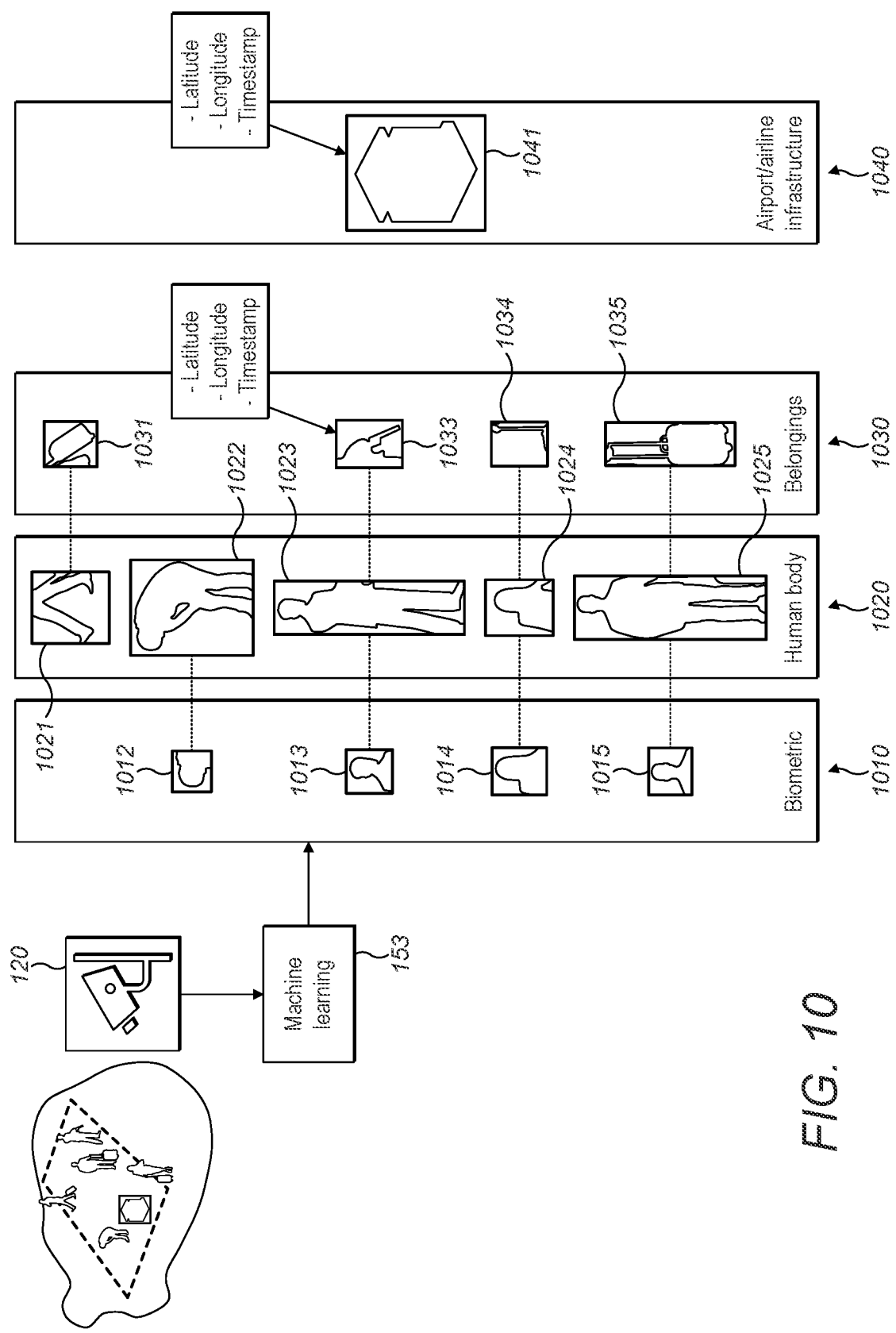
FIG. 10 is a schematic diagram showing how a plurality of images associated with the same individual may be matched together.

As shown in FIG. 10, the system collates all of the generated embedding vectors according to the unique ID matched with each embedding vector in order to create a dataset for each identified passenger that comprises all collected images of the passenger, the corresponding embedding vectors and associated metadata described above. As shown in FIG. 10, the dataset for each passenger may be categorized into data subsets. A first subset may be a biometric dataset 1010 comprising the collected data and generated embedding vectors and metadata extracted by the face-feature extraction module, as described above in FIG. 7. A second subset may be a body dataset 1020 comprising the collected data and generated embedding vectors and metadata extracted by the body-feature extraction module, as described above in FIG. 6. A third subset may be a belongings dataset 1030 comprising the collected data and generated embedding vectors and metadata extracted by the item-feature extraction module, as described above in FIG. 8. In preferred embodiments, a single embedding vector is generated that represents the best image contained within each subset, as described above.

In some embodiments, a final subset, an infrastructure dataset 1040, may be created that comprises the collected data and generated embedding vectors and metadata extracted by the item-feature extraction module that is not associated with an identified passenger.

This enables the system 100 to positively identify a new image of an entity and to detect anomalies, as further described below.

Identification and Tracking Process

As indicated above, the system 100 is able to track an entity by recognizing that entity at a later time or location using machine learning techniques. This is achieved by assigning a unique ID to each individual entity detected and by determining whether a detected entity has been previously identified.

Figure 11:
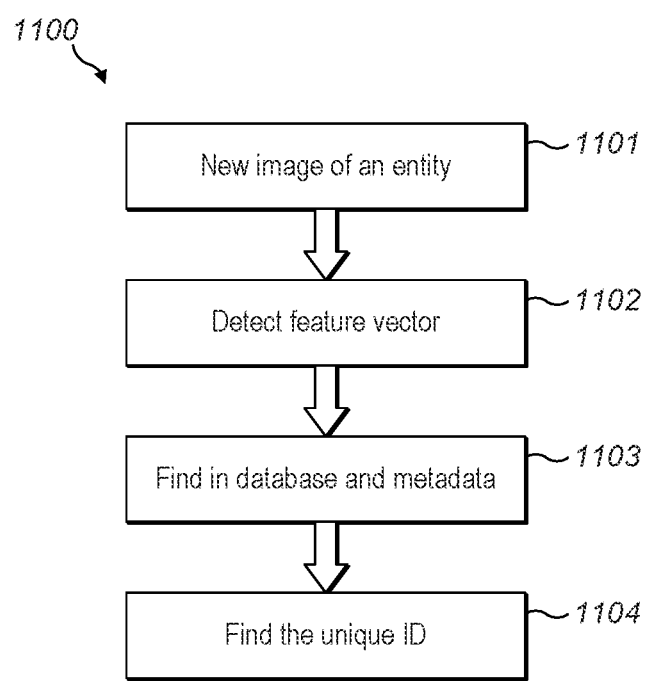
FIG. 11 is a flow diagram showing an example process of the uniquely identifying an article using a new (unseen) image.

This may be achieved by the example process 1100 for identifying an entity shown in FIG. 11. In a first step 1101, a new image is obtained of the entity. In a second step 1102, a characteristic feature vector associated with the new image is determined. In a third step 1103, a search database is queried in order to find similar characteristic feature vectors and corresponding metadata in the search database, for example by using a machine learning model to compare between the characteristic feature vector for the new image and each of the characteristic feature vectors in the search database. In a fourth step 1104, if a similar characteristic feature vector in the search database is identified, the unique ID associated with that characteristic feature vector is found. The machine learning model may then associate the found unique ID with the new image of the entity. Accordingly, embodiments of the invention can advantageously be used for uniquely identifying any entity by comparing the similarity of a number of similar images taken over time, from different angles, or in various locations, as further described below. In preferred embodiments, the unique ID may be associated with an identifier associated with each entity, such as passenger related information or a bag tag number. This enables the system to match an identified entity, such as a person or an item of baggage, with known information relating to that entity.

When seeking to identify, or re-identify, an entity from a newly obtained image, the system generates a list of images that are most similar to the query image (also known as a list of nearest neighbours). This is achieved by searching the query, or search, database for embedding vectors that are closest, in the Euclidean distance sense, to the query image embedding. Each embedding vector is represented as an N-dimensional vector in a vector-space. In some embodiments, the embedding vectors are 128-dimensional vectors, however the embedding vectors may be 2048-dimensional vectors. The relative separation in the vector-space between two embedding vectors, which each represent a different image in the database, indicates the semantic similarity between the two vectors. This can be efficiently done, as embeddings are low-dimensional real-valued vectors. Adopting such an approach enables the system to learn to use more subtle cues, like the structure of an entity's surface or the presence of additional elements, like patterns or regions of different materials, to distinguish between similar entities.

The search database may be reduced in order to improve the operational efficiency of the system and to reduce the false positive rate of the system. For example, the time stamp of each image may be compared against an expected journey time for the entity. A reduced set of images can be identified based on an expected distance that the entity will travel during a predefined time window. For example, a person may not be expected to travel 10 meters in 1 second. The system may then disregard any entities that are calculated to be located further away than this expected distance.

The most similar images produce a lower distance score that can be used to identify the original entity. The image may then be stored for future use cases, such as detecting whether any damage has occurred during the journey.

Figure 12:
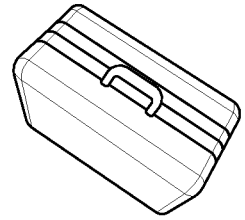
FIG. 12 is an example image obtained during an example process for identifying similar items of baggage.

An example list of nearest neighbours for a sample image is shown in FIG. 12. As shown in the example, the machine learning model provides a list of the 15 images that were identified as being closest to the query image. However, it should be noted that this number is for example only and any number, K, of closest neighbours can be provided. When K is equal to 1, the model only shows the most similar bag.

In some embodiments, additional steps are performed when machine learning and computer vision techniques alone are unable to uniquely identify an entity. For example, in preferred embodiments the system 100 retrieves biometric and passport data from a passport control system and compares the retrieved data against the characteristic feature vectors obtained at the passport control location. This enables the system 100 to definitively match a unique ID to an individual passenger. In other embodiments, where biometric and passport data is not retrieved, the system 100 may uniquely identify an individual passenger using other data sources, such passenger-provided tracking information or stored historical passenger-related data. In further embodiments, the system can identify whether a detected person is a member of staff for example a cleaner, security guard or ground crew member. This may be achieved by determining whether the unique ID or retrieved biometric data is matched with a database of airport staff.

Figure 13:
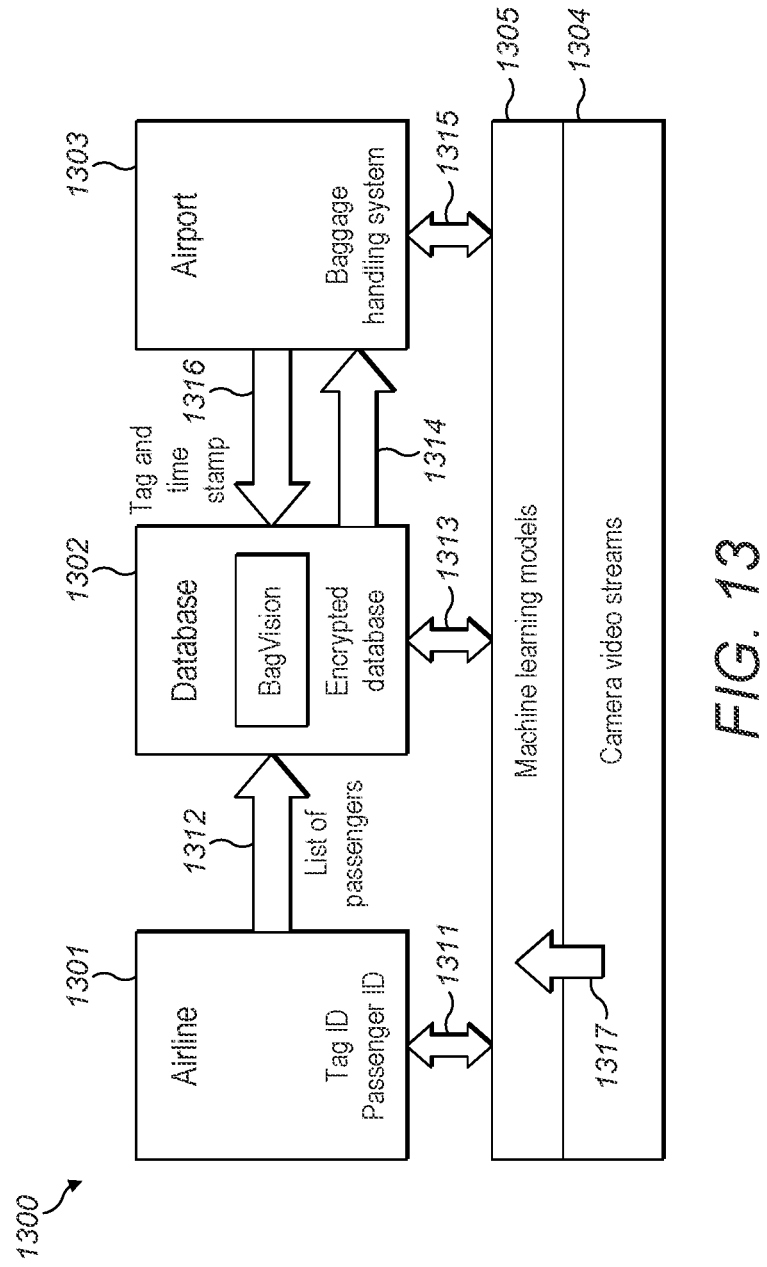
FIG. 13 is an exemplary schematic diagram of a data collection system for the collection and recognition of images and the flow of data for a baggage handling system.

As indicated above, the above steps of identifying an entity may require the system 100 to interface with additional hardware elements. Example hardware elements are shown in FIG. 13, which comprises Airline Systems 1301, Remote Databases 1302, Airport BHS Systems 1303, Camera Arrays 1304, and a Machine Learning Core 1305. In specific embodiments, Data 1311 including bag identifiers and passenger identifiers is exchanged between the airline systems 1301 and the machine learning core 1305. Data 1312 including a passenger list is sent from the airline systems 1301 and the database 1302. Data 1313 including images of entities and associated metadata stored in a database is exchanged between the database 1302 and the machine learning model 1305, and is also send from the database 1302 to the airport systems 1303. Data 1315 is exchanged between the airport systems 1303 and the machine learning model 1305. Data 1316 including a bag tag identifier and an associated timestamp are sent from the airport systems 1303 to the database 1302. Finally, data 1317 including camera image data is sent from the camera array 1304 to the machine learning model 1305.

To track an entity, in preferred embodiments the system 100 produces a confidence score when a subsequent image of a passenger is matched to an existing unique ID. The confidence score may be based on the following factors. Firstly, the machine learning distance score between the query image and its nearest neighbour as described above. For example, a particular item of clothing worn by the passenger, such as an unusual jacket, can produce a higher confidence score than more regular clothing. Secondly, the time and location of the query image compared to the flight related information relating to the passenger associated with the nearest neighbour. For example, if the query image is obtained in a check-in queue but is matched with a passenger who is scheduled to leave within the next hour than that will produce a comparatively lower confidence score than if the query image were to be matched with a passenger scheduled to leave in 6 hours. Finally, the confidence score may be the sum of confidence scores produced by different types of embedding vectors. For example, a higher confidence score will be produced if the nearest neighbour has very similar facial features in addition to very similar clothing, body, posture or other features as well.

The accurate tracking of an entity is ensured by effectively maintaining the query, or search, database. As indicated above, the search database includes all entities presently known to the system. Entities may be deleted from the search database, for example if the system 100 receives a message that a particular flight has departed from the airport. This may be achieved by assigning labels to passengers who have had their boarding pass scanned when boarding a flight and receiving a notification when that particular flight departs.

When tracking an entity, the system 100 preferentially searches for nearest neighbours having embedding vectors with a high associated confidence score. In this way, the system can recognise a known person even if their face cannot be clearly identified by positively identifying their accompanying items of baggage, or clothing, or posture.

Further to the above, if no sufficiently close match can be found then a new unique ID is assigned to the identified passenger. The veracity of the new unique ID may be checked when the new passenger presents themselves at a passport check point. In preferred embodiments, the system 100 determines whether a passenger is a new passenger by comparing the distance score between the query image and the nearest neighbour to a predetermined threshold value. If the distance is above the predefined threshold (i.e. if the semantic similarity is below a threshold), the identified passenger is considered to be new and a new unique ID is assigned.

Learning Models

One specific example of a machine learning method is Metric Learning Approach. The method uses Triplet network architecture to learn embeddings of a plurality of images of an entity. To train the models, triplet images comprising a first image of a first entity, a second image of the first entity and a first image of a second entity. The training procedure searches for matching images of the entity by searching for nearest neighbours in the embedding vector space.

Other exemplary approaches are the use of convolutional features from a deep network pre-trained on an auxiliary image identification task (for example ResNet or VGG trained on IMAGENET). For each image of an entity, the machine learning builds a fixed-length descriptor by max-pooling these features over channel dimension. The model searches for matching images, by searching for nearest neighbours in the descriptor space.

Another Metric Learning Approach considers Siamese network architecture to learn embeddings of images of different entities. The data presents pairs of the same entity and different entities. For example, images of the same item of baggage may be created by applying random distortions (for example rotation, perspective warp, intensity/contrast changes) to the base baggage image. The algorithm would then search for matching baggage images, by searching for nearest neighbours in the embedding space.

One other specific example Adapts NetVLAD architecture (originally used for weakly supervised place recognition) for images of an entity that match a particular scenario.

Although more or less layers may be used, and it will be appreciated that other backbone neural networks may be used instead of the above methods. Methods might use implementation of loss function for manually tuned neural network architectures or for the entity detection and segmentation, and will be known to the skilled person. The pre-processing and machine learning (deep learning and neural network) might be remotely accessible by wired or wireless communication protocols which will be known to the skilled person.

Embodiments of the invention have the advantage of being able to track a passenger not only by their facial features, but also by using any feature that can be used to uniquely identify a passenger, such as clothing. This enables the system to integrate with camera data deriving from, for example, CCTV feeds that do not have the resolution to be able to identify facial features with great accuracy, but can improve the false negative detection rates of a passenger by identifying body features, such as the relative distance from the neck to the hip, or the relative distance between the eyes. In this way, the system may be able to positively identify a person without identifying any facial features and may successfully integrate with any existing camera or identification checkpoint systems for an improved detection and tracking performance. Additionally, the system is also able to differentiate between twins who have similar, or identical, facial features but who may be wearing different items of clothing.

Learning Model Training Process

In an initial phase, the machine learning model is trained using a training database of training data once enough raw data has been captured. In some embodiments, newly collected data is added to the training data in order to adjust the models.

Figure 14:
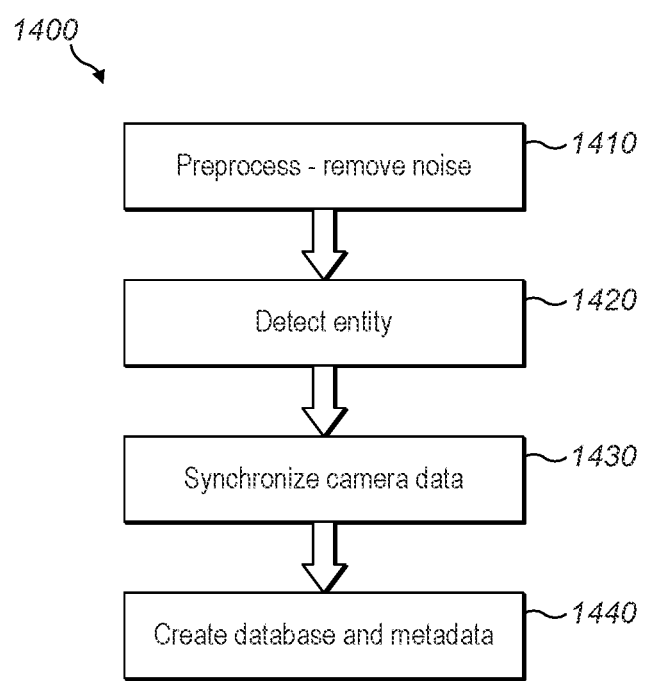
FIG. 14 is a flow diagram showing an example process of creating databases.

FIG. 14 shows a flow diagram illustrating an example process flow 1400 for creating a training database comprising training data and associated metadata based on image data obtained from cameras and associated descriptive data (for example, an article tag number and a timestamp).

In a first step, 1410 the raw images obtained from the cameras are preprocessed to remove noise. In a second step, 1420 each image is analyzed to identify whether an entity has been detected in the image. In a third step, 1430 each camera is synchronized to ensure that data obtained from each camera is collected accurately. In a final step, 1440 the training database is created from the processed images and stored with associated metadata. In addition, the machine learning model will also determine a characteristic feature vector associated with each processed image and store that characteristic feature vector in the database.

In preferred embodiments, the characteristic feature vector comprises characteristic feature values associated with any one or more of biometric data, face features, height, style, clothing, pose. gender, age, emotion, destination gate. and gesture recognition. However, it will be appreciated that this list is exemplary only and that in principle any characteristic value may be included in the characteristic feature vector.

If required. a further fine-tuning step is performed (not shown) in order to adapt a machine learning model to a specific site by using data of the new environment or domain. The fine-tuning step may also be utilized where two different machine learning models are used. For example, a first machine learning model (for example, a nearest neighbor model) may compare feature vectors of images that were produced by a second machine learning model (for example, a deep learning or convolutional neural network).

Accordingly, in some embodiments the system initially identifies a passenger's body, generates an embedding vector based on characteristics of the passenger's body, and assigns the identified passenger a unique identifier.

Figure 15A:
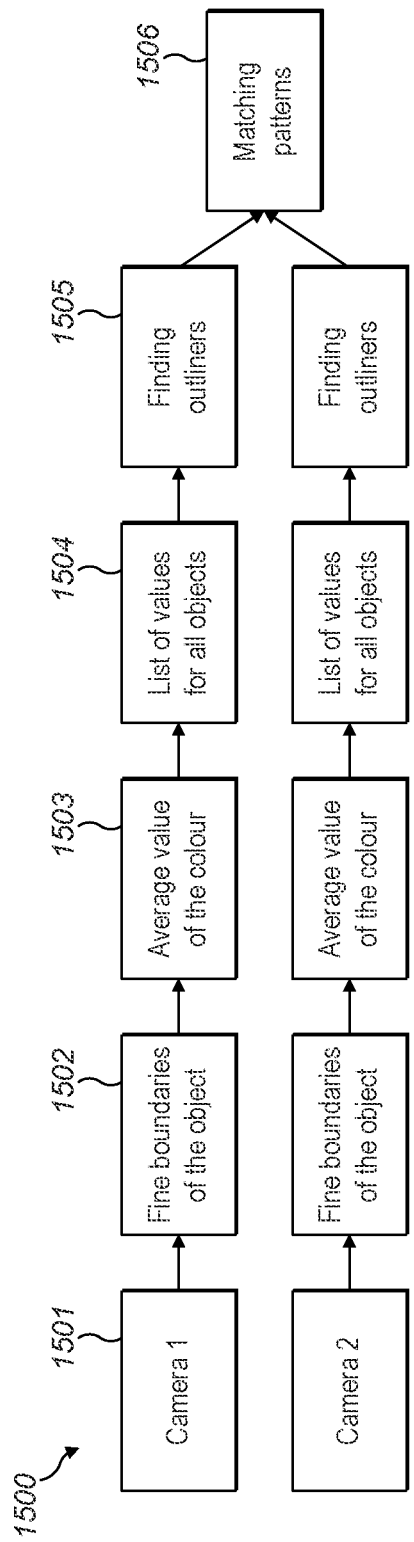
FIGS. 15A and 15B show flow diagrams showing the sub-steps that comprise the process steps of synchronizing cameras for similar entities.
Figure 15B:
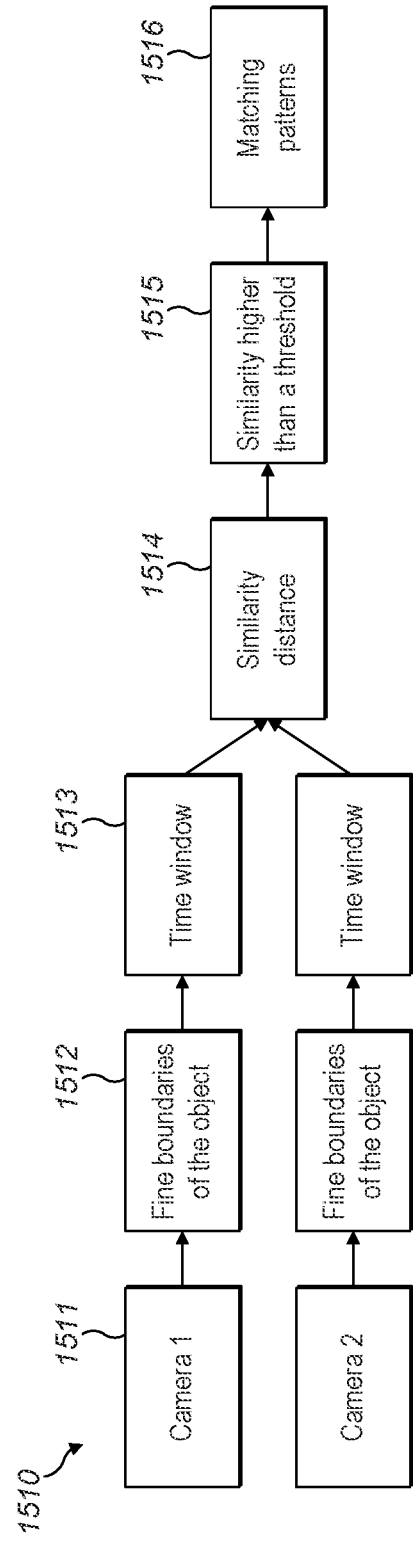

In one embodiment, the pre-processing step of synchronizing cameras 1430 may comprise the steps shown in FIG. 15A and FIG. 15B.

In a first method 1500, the cameras are synchronized by identifying entities having an unusual and distinctive colour. In a first step 1501, image data is obtained from a plurality of cameras. In a second step 1502, fine boundaries of the detected object are identified for each camera data set. In a third step 1503, an average colour value is identified for the detected object, for example using RGB colour values, for each camera data set. In a fourth step 1504, each detected object is listed by average colour value for each camera data set. In a fifth step 1505, outliers or unusual colours are identified by finding the most distinct colour values for each camera data set. In a sixth step 1506, the patterns are matched between the different camera data sets in order to identify a time difference between the bag being detected by the different cameras, thereby synchronizing the plurality of cameras.

In another embodiment, the pre-processing step of synchronizing cameras 1430 may comprise a second method 1510 shown in FIG. 15B. In a first step 1511, image data is obtained from a plurality of cameras. In a second step 1512, fine boundaries of the detected object are identified for each camera data set. In a third step 1513, a time window is determined for each camera data set. In a fourth step 1514, a similarity distance is determined between the different camera data sets. In a fifth step 1515, it is determined whether the similarity between data sets is higher than a predefined threshold. In a sixth step 1516, if the similarity is higher than the predefined threshold then the patterns are matched between the different camera data sets in order to synchronize the plurality of cameras.

Figure 16B:
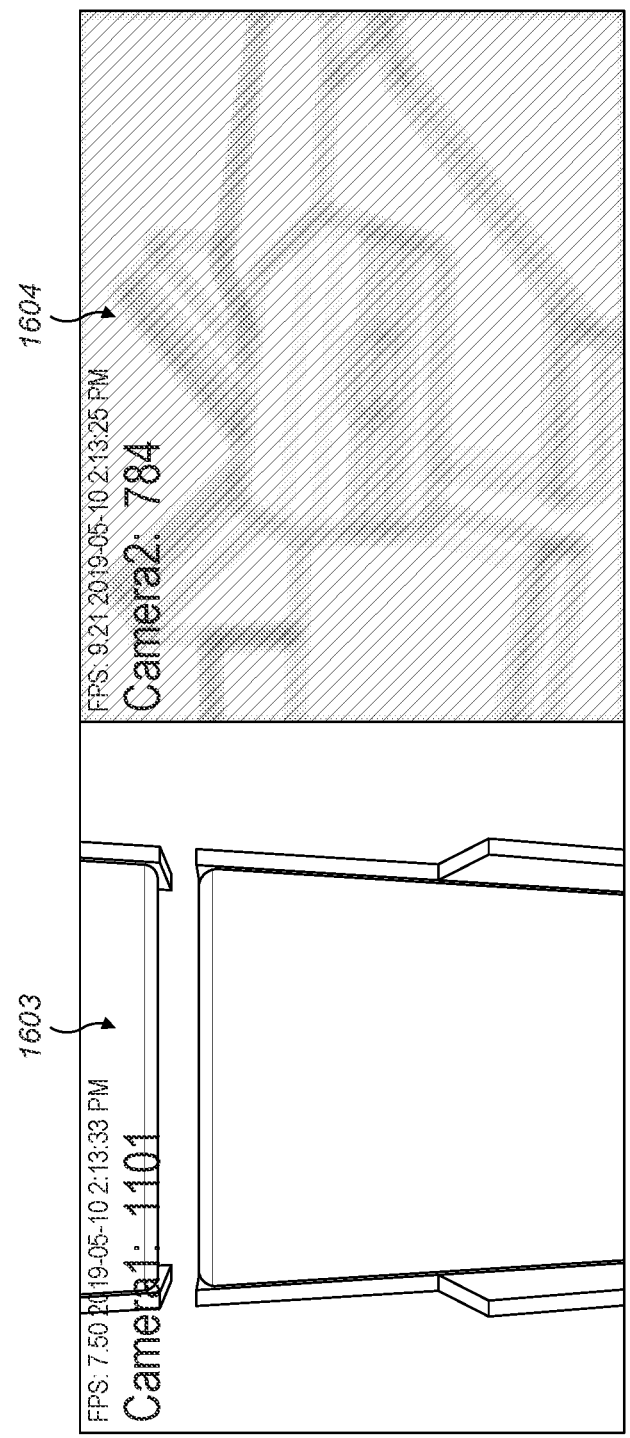

Further to the above, the pre-processing step 1410 may include removing images that contain noise. In the ATI, noise may derive from a wide variety of sources. For example, X-ray scanning devices, network noise, and also where long length cables are used to transmit data. Excessive noise disadvantageously results in missing data points or low-quality images, as may be seen from FIGS. 16A and 16B which show example images 1601, 1604 that are corrupted due to excessive noise compared to example images 1602, 1604 that do not contain excessive noise. Accordingly, images that are identified as having excessive noise are removed during the pre-processing phase. As noise in images is manifested as grey pixels, in preferred embodiments the corrupted images may be removed by using three configurable numbers to identify the number of grey pixels in each image as further described with reference to FIG. 17.

Figure 17:
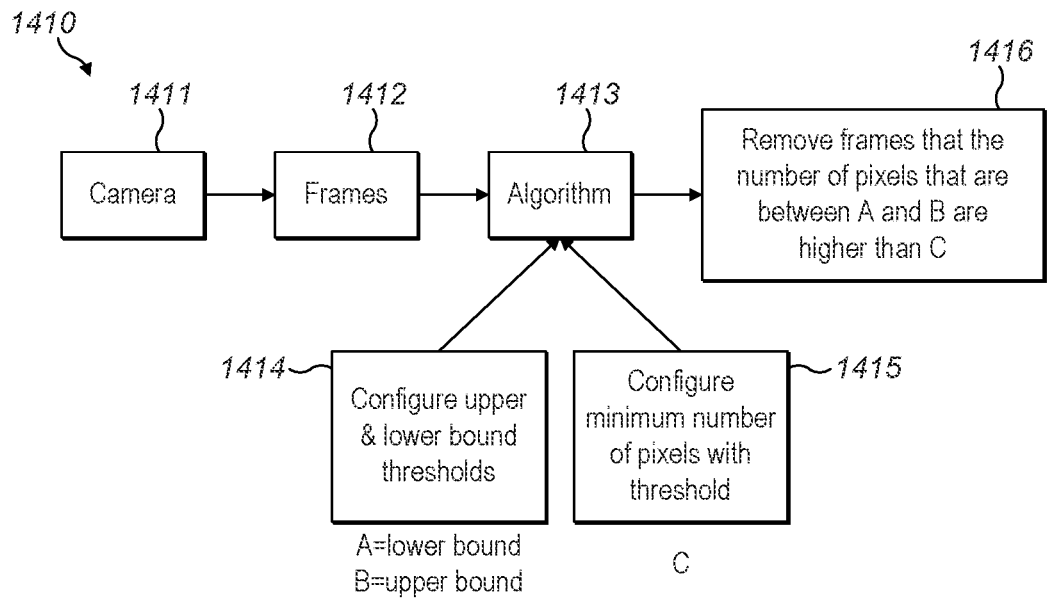
FIG. 17 is a flow diagram showing the sub-steps that comprise the process step of pre-processing to removing noise from input data.

As shown in FIG. 17, the pre-processing step 1410 comprises: in a first step 1411, obtaining image data from one or more cameras; in a second step 1412, analysing each frame within the image data; in a third step 1413, applying an algorithm to each frame, whereby the algorithm is firstly configured 1414 to receive upper and lower pixel value thresholds and is further configured 1415 to identify a minimum number of pixels within the upper and lower thresholds; and in a final step 1416, a frame is removed from the image data if the number of pixels in the frame exceeds the minimum number of pixels and falls within the upper and lower pixel value thresholds. In other words, the algorithm first analyses each pixel to identify "grey" pixels by determining whether a greyscale value of that pixel lies within a range defined by the upper and lower boundary values, where the maximum pixel value (corresponding to a white pixel) is 255 and the minimum pixel value (corresponding to a black pixel) is zero. The value of a grey pixel may therefore be defined as an appropriate range of pixel values around the midpoint of this maximum range of values, as defined by the upper and lower boundary values. The algorithm then counts the number of pixels determined to be grey within the frame and determines whether the number of grey pixels exceeds the minimum number of required grey pixels. If so, the image is considered to contain excess amounts of noise and is discarded.

In some embodiments, other filtering and image processing techniques may be used to remove other low-quality images, such as excessively dark or excessively white images.

In further embodiments, frames with excessive amounts of noise may be removed by determining whether an image brightness is greater than a first threshold and less than a second threshold and only processing the image if the image brightness is within the first and second thresholds.

In a preferred embodiment, the images are down sampled to maintain an aspect ratio. For example, the aspect ratio may be down sampled to fit a 256×256 image. This advantageously enables the system to maintain accuracy when processing images obtained from cameras having different resolutions.

In a preferred embodiment, images are cropped before being saved to the training database. The pre-processing step advantageously improves the efficiency and accuracy of correctly identifying an entity in a subsequent recognition phase, and additional minimizes storage requirements.

For example, a raw 15-minute input video recording may occupy about 1.1 GB of data at 640×480 resolution and 5 FPS. However, cropping the images to only include a region of interest can reduce the file size to approximately 10 to 60 MB of data, thereby reducing the storage requirements by a factor of 20-100 times.

Figure 18:
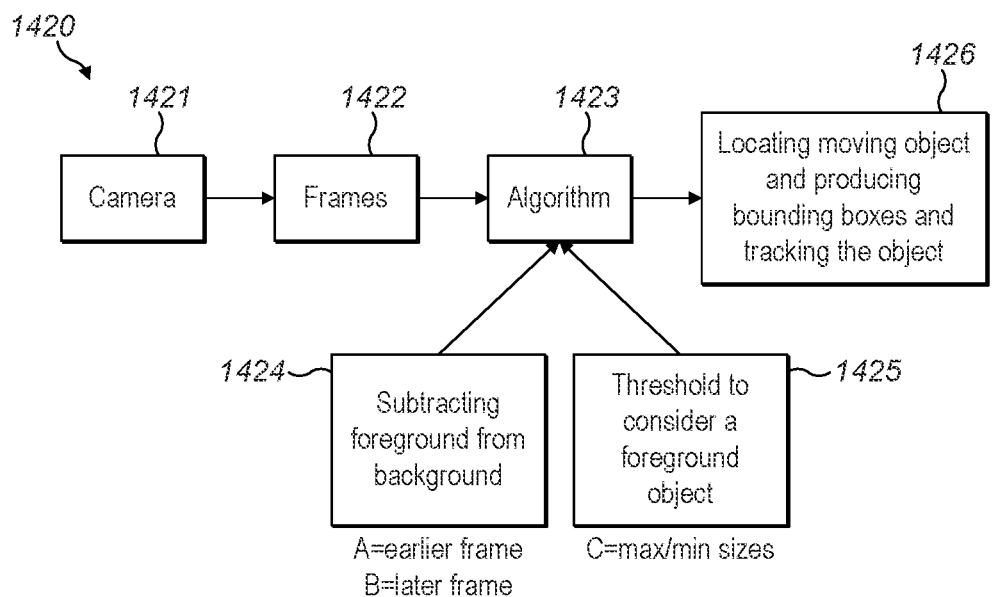
FIG. 18 is a flow diagram showing the sub-steps that comprise the process step of detecting, tracking and measuring moving articles.

In preferred embodiments, the pre-processing step of detecting an entity may comprise the steps shown in FIG. 18.

As shown in FIG. 18, the pre-processing step 1420 comprises: in a first step 1421, obtaining image data from one or more cameras; in a second step 1422, analysing each frame within the image data; in a third step 1423, applying an algorithm to each frame, whereby the algorithm is firstly configured 1424 to subtract the foreground of the image from the background of the image and is further configured 1425 to identify a threshold value that identifies an object as a foreground object; and in a final step 1426, a moving foreground object is identified, a boundary box is positioned around the identified foreground object and the object is tracked over time.

In some embodiments, the algorithm may be configured to perform background subtraction 1424 using known motion-based background subtraction methods such as Mean of Gaussian (MOG), MOG2, CNT, GMG, or LSBP. The use of background subtraction can improve the mode detection speed and is able to remove noise from the images, thereby enabling more efficient processing of an image by the edge processor.

The use of background subtraction techniques also advantageously enables moving objects to be extracted from relatively fixed backgrounds, as well as identifying and isolating foreground objects on a moving backgrounds.

Pixels in the foreground mask may be grouped into an area of connected pixels, known as a blob, using known connected component analysis techniques. This process advantageously limits the noise and creates a boundary around the entire detected object rather than creating several small ROIs. If a blob spans substantially the entire height or width of a frame, then the entire frame is discarded, as it indicates a serious image corruption. Finally, the shape of each detected blob is calculated. If a blob height, width and area are each within predefined ranges and the spatial position of the blob intersects with a ROI then the blob is considered to be a valid detection. If an entity is detected, then a bounding box defining the location of the entity within the frame is superimposed on the image according to known techniques.

In the example shown in FIG. 19, two blobs are identified. The first, larger, blob 1901 corresponds to the entity being tracked. However, a second, smaller, blob 1902 corresponding to a region between the rollers of a baggage conveyor belt has also been identified. Blob 1902 is not large enough to fall into the predefined range of height, width and area, and so is not determined to be an entity to be tracked. Accordingly, in FIG. 19 the location of the bounding box 1903 is correctly placed around the entity to be tracked and is not influenced by the presence of blob 1902.

An example source code defining a set of example parameters for grouping pixels into blobs is provided below.

```
Use_roi = True
detect_shadow = True
history = 100
var_threshold = 16
blob_discard_threshold = 0.8
min_blob_height = 100
max_blob_height = 380
min_blob_width = 100
max_blob_width = 500
min_blob_area = 10000
max_blob_area = 160000
```

In the above, "history" defines the number of frames used to find a moving foreground object. In the above example, a sequence of 100 frames from a video stream are used in order to identify each new foreground object. "var_threshold" defines the threshold of sizes of objects for subtracting from the background. In other words, the "var_threshold" indicates the sensitivity of a detector: the lower the value, the smaller the pixel intensity changes need to be in order to be marked as a foreground pixel. Accordingly, lower values generate more noise and can generate false detections whereas higher values produce less noise, but are susceptible to failing to detect moving objects. The "blob_discard_threshold" parameter defines the threshold for filtering out corrupted frames from the video due to excessive noise, and in the above example is set at 80% of the total number of pixels in the frame. In alternative embodiment, the threshold may be set at 95% of the total number of pixels in the frame. "min_blob_height" and "max_blob_height" define upper and lower thresholds for the vertical height of a blob in pixels, and in the above example the acceptable blob height is set at between 100 and 380 pixels. In alternative embodiments, the acceptable blob height may be set at between 30 and 300 pixels. "min_blob_width" and "max_blob_width" define upper and lower thresholds for the horizontal width of a blob in pixels, and in the above example the acceptable blob width is set at between 100 and 500 pixels. In alternative embodiments the acceptable blob width may be set at between 30 and 400 pixels. "min_blob_area" and "max_blob_area" define upper and lower thresholds for the 2D area of a blob in pixels, and determine whether an identified foreground object should be considered a detected entity, such as an item of baggage. In the above example the acceptable blob pixel area is set at between 10,000 and 160,000 pixels. Frames that include blobs which fall outside of the above parameters are discarded.

In alternative embodiments, threshold values for the blob area may be based on a percentage of the total number of pixels in a frame. For example, a lower threshold may be 10% of the total number of pixels in a frame and an upper threshold may be 40% of the total number of pixels in a frame. For a video of 640×480 resolution, these thresholds would correspond to an acceptable blob pixel area of between 30,720 and 122.880 pixels. In another example, a lower threshold may be 5% of the total number of pixels in a frame and an upper threshold may be 50% of the total number of pixels in a frame. For a video of 640×480 resolution, these thresholds would correspond to an acceptable blob pixel area of between 15,360 and 153,600 pixels.

Once detected, the entity may be tracked through the number of frames used by the system to identify each foreground object (i.e. the "history") using the following example source code.

```
Def analyse_detections(detections):
    print( 'Analysing flow direction...' )
    mean_flow_1 = [ ]
    for ndx in range(len(detections[1:])):
        n_frame = detections[ndx].frame_ndx
        prev_frame = detections[ndx-1].frame_ndz
        if prev_frame == n_frame - 1:
            # Detections in the consecutive frame
            c1 = np.array(detections[ndx].center ( ))
            c2 = np.array(detections[ndx-1].center ( ))
            delta = c1 - c2
            mean_flow_1.append(delta)
        print(delta)
```

To create sufficient data for training models that can identify unique features between different images, a synchronization method is used to identify the same entity that is detected by numerous cameras. This is achieved by synchronizing the data obtained from each camera, as the frame rate of each individual camera may vary. As indicated above, camera synchronisation enables the cameras to accurately establish the exact location of a particular entity. Additionally, camera synchronisation is advantageous because is enables the system to accurately reduce the searchable area in which a passenger may be expected to be re-identified within a predefined time window.

In some embodiments, resynchronizing the data obtained from each camera is most easily done using entities that have distinctive or non-common features (for example unusual shapes or uncommon colours), as they can be readily identified.

The following machine learning algorithms may also be used to implement embodiments of the invention. This shows accuracy metrics of different machine learning algorithms. Alternatively, or in addition to uniquely identifying a bag and retrieving the passenger ID, the model can produce a translation from 128-dimentional vector to descriptive labels.

The system 100 may interact with other airport systems in order to output the determined bag type or/and colour to other systems.

This may be performed by way of Web Services Description Language, WSDL, Simple Article Access Protocol (SOAP), or Extensible Markup Language, XML, or using a REST\JSON API call but other messaging protocols for exchanging structured information over a network will be known to the skilled person.

From the foregoing, it will be appreciated that the system, device and method may include a computing device, such as a desktop computer, a laptop computer, a tablet computer, a personal digital assistant, a mobile telephone, a smartphone. This may be advantageously used to capture an image of a bag at any location and may be communicatively coupled to a cloud web service hosting the algorithm.

The device may comprise a computer processor running one or more server processes for communicating with client devices. The server processes comprise computer readable program instructions for carrying out the operations of the present invention. The computer readable program instructions may be or source code or article code written in or in any combination of suitable programming languages including procedural programming languages such as Python, C, article orientated programming languages such as C#, C++, Java, and their related libraries and modules.

Exemplary embodiments of the invention may be implemented as a circuit board which may include a CPU, a bus, RAM, flash memory, one or more ports for operation of connected I/O apparatus such as printers, display, keypads, sensors and cameras, ROM, and the like.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

The invention claimed is:

1. An image processing system for identifying an entity, the system comprising means for:
   a. determining a region within a received image of an entity wherein the region encloses the entity;
   b. segmenting the region into one or more sub regions;
   c. determining a first set of embedding vectors comprising a respective embedding vector for each of the sub regions, wherein each of the first set of embedding vectors is defined by a plurality of characteristic feature values that uniquely describe each sub region;
   d. determining a second set of embedding vectors, wherein each of the second set of embedding vectors is associated with a respective one of a plurality of known entities, and each of the plurality of known entities is associated with a unique identifier;
   e. comparing the first set of embedding vectors with the second set of embedding vectors; and
   f. based on the comparison, determining whether the entity is matched with a matching known entity of the plurality of known entities or is a new entity, wherein:
      i. if the entity is matched with the matching known entity, the entity is associated with the unique identifier associated with the matching known entity, or;
      ii. if the entity is the new entity, the entity is associated with a new identifier.

2. The system of claim 1, further comprising means for authorising the matching known entity for entry or exit via a gate, and further comprising means for associating the unique identifier with a passenger related information or a bag tag number.

3. The system of claim 1, wherein the first set of embedding vectors are determined based on a first image of the entity and a further set of embedding vectors are determined based on a second image of the entity.

4. The system of claim 3, further comprising means for selecting a subset of optimum embedding vectors for the entity from the first set of embedding vectors and further sets of embedding vectors by identifying embedding vectors that have a largest value of a predetermined characteristic feature value.

5. The system of claim 1, wherein the plurality of characteristic feature values are associated with one or more of: biometric data, face features, height, style, clothing, pose, gender, age, emotion, destination gate, or gesture recognition.

6. The system of claim 3, wherein the system further comprises means for associating the first image with a first predetermined location and associating the second image with a second predetermined location different from the first predetermined location, wherein the first predetermined location and the second predetermined location are each associated with one or more of customer car parks, airport terminal entrances and exits, airline check-in areas, check-in kiosks, terminal concourses, customer shopping and/or dining areas, passenger lounges, security and passport control areas, customs and excise areas, arrival lounges, departure lounges, and baggage processing areas.

7. The system of claim 1 further comprising means for associating latitude, longitude and timestamp data with a location of the entity in the received image.

8. The system of claim 1, wherein the entity is a user and the one or more sub regions includes a first sub region associated with a head of the user, a second sub region associated with a body of the user, and a third sub region associated with belongings accompanying the user, and wherein characteristic feature values are associated with one or more of:

biometric data, face features, height, style, clothing, pose, gender, age, emotion, destination gate, or gesture recognition.

9. An image processing method for identifying an entity, the method comprising the steps of:
   a. receiving an image of an entity and determining a region within the image that encloses the entity;
   b. segmenting the region into one or more sub regions;
   c. determining a first set of embedding vectors comprising a respective embedding vector for each of the one or more sub regions, wherein each of the first set of embedding vectors is defined by a plurality of characteristic feature values that uniquely describe each sub region;
   d. determining a second set of embedding vectors, wherein each of the second set of embedding vectors is associated with a respective one of a plurality of known entities, and each of the plurality of known entities is associated with a unique identifier;
   e. comparing the first set of embedding vectors with the second set of embedding vectors;
   f. determining, based on the comparison, whether the entity is matched with a matching known entity of the plurality of known entities or is a new entity, wherein
      i. if the entity is matched with the matching known entity, the entity is associated with the unique identifier associated with the matching known entity, or;
      ii. if the entity is the new entity, the entity is associated with a new identifier.

10. The method of claim 9, further comprising authorising the matching known entity for entry or exit via a gate, and further comprising sending a message to actuate one or more infrastructure systems if any of the characteristic feature values exceeds a threshold value.

11. The method of claim 10, wherein the one or more infrastructure systems comprise one or more of: security barriers, public address systems, or emergency lighting systems.

12. The method of claim 9, further comprising associating the unique identifier with passenger related information or a bag tag number.

13. The method of claim 9, wherein determining whether the entity is matched with the matching known entity is based on a degree of similarity between each of the first set of embedding vectors and each of the second set of embedding vectors.

14. The method of claim 9, further comprising pre-processing the received image, wherein pre-processing comprises one or more of: sampling raw data, reducing background noise in the received image, defining a region of interest within each image, removing a background of the received image, and synchronising cameras.

15. The method of claim 13, further comprising determining a confidence score based on the degree of similarity, and/or flight related information associated with the unique identifier associated with the matching known entity.

16. The method of claim 9, wherein the entity is a user and the one or more sub regions includes a first sub region associated with a head of the user, a second sub region associated with a body of the user, and a third sub region associated with belongings accompanying the user, and wherein characteristic feature values are associated with one or more of: biometric data, face features, height, style, clothing, pose, gender, age, emotion, destination gate, or gesture recognition.

17. The method of claim 9, further comprising associating latitude, longitude and timestamp data with a location of the entity in the received image.

* * * * *